(12) United States Patent
Tooyama

(10) Patent No.: US 6,687,706 B2
(45) Date of Patent: Feb. 3, 2004

(54) CONTENT PROVIDING SYSTEM CAPABLE OF REDUCING BURDEN ON USERS

(75) Inventor: Kazuki Tooyama, Tokyo (JP)

(73) Assignee: NEC Corporation, Tokyo (JP)

(*) Notice: Subject to any disclaimer, the term of this patent is extended or adjusted under 35 U.S.C. 154(b) by 375 days.

(21) Appl. No.: 09/846,832

(22) Filed: May 1, 2001

(65) Prior Publication Data
US 2001/0037335 A1 Nov. 1, 2001

(30) Foreign Application Priority Data
May 1, 2000 (JP) .................................... 2000-132176

(51) Int. Cl.[7] ............................ G06F 17/00; G06F 7/00
(52) U.S. Cl. ........................................................ 707/102
(58) Field of Search ............................ 707/3, 10, 100, 707/102, 104.1

(56) References Cited

U.S. PATENT DOCUMENTS

| | | | |
|---|---|---|---|
| 5,802,518 A | * | 9/1998 | Karaev et al. .................. 707/9 |
| 5,861,906 A | * | 1/1999 | Dunn et al. .................... 725/87 |
| 6,047,327 A | * | 4/2000 | Tso et al. ..................... 709/232 |
| 6,446,065 B1 | * | 9/2002 | Nishioka et al. ............... 707/5 |
| 6,523,021 B1 | * | 2/2003 | Monberg et al. ............... 707/2 |

FOREIGN PATENT DOCUMENTS

JP    11-85656    3/1999

* cited by examiner

*Primary Examiner*—Greta Robinson
*Assistant Examiner*—Susan Rayyan
(74) *Attorney, Agent, or Firm*—Scully, Scott, Murphy & Presser

(57) ABSTRACT

In a content providing system including a content provider server connected between a network and a provider terminal, and user terminals connected to the network, the content provider server is constructed by a content managing table for storing contents along content titles in correspondence with management identification numbers, a content managing section for managing the content managing table, a user information managing table for storing status keys showing access statuses of the stored content titles accessed by the user terminals in correspondence with user identification numbers thereof, a user information managing section for managing the user information managing table so as to set a respective one of the status keys when one of the user terminals accesses one of the stored content titles, and a content displaying section for displaying a content title list on the display unit of the one of the user terminals in accordance with the status keys belonging to the user identification number of the one of the user terminals.

34 Claims, 28 Drawing Sheets

| M. ID | REG. DATE | CONTENT | |
|---|---|---|---|
| | | TITLE | DATA |
| M. ID A | REG. DATE A | CONTENT A | ... |
| M. ID B | REG. DATE B | CONTENT B | ... |
| M. ID C | REG. DATE C | CONTENT C | ... |
| .. | .. | .. | .. |
| M. ID G | REG. DATE G | CONTENT G | ... |

| USER ID | FINAL VISIT DATE | STATUS KEY FIELDS | | |
|---|---|---|---|---|
| | | FAQ 001 | ... | FAQ MAX |
| USER 1 ID | USER 1 FINAL VISIT DATE | STATUS KEY 1 | ... | STATUS KEY MAX |
| USER 2 ID | USER 2 FINAL VISIT DATE | STATUS KEY 1 | ... | STATUS KEY MAX |
| USER 3 ID | USER 3 FINAL VISIT DATE | STATUS KEY 1 | ... | STATUS KEY MAX |
| .. | .. | .. | ... | .. |
| USER n ID | USER n FINAL VISIT DATE | STATUS KEY 1 | ... | STATUS KEY MAX |

STATUS KEY = "S" OR "△ (SPACE)"

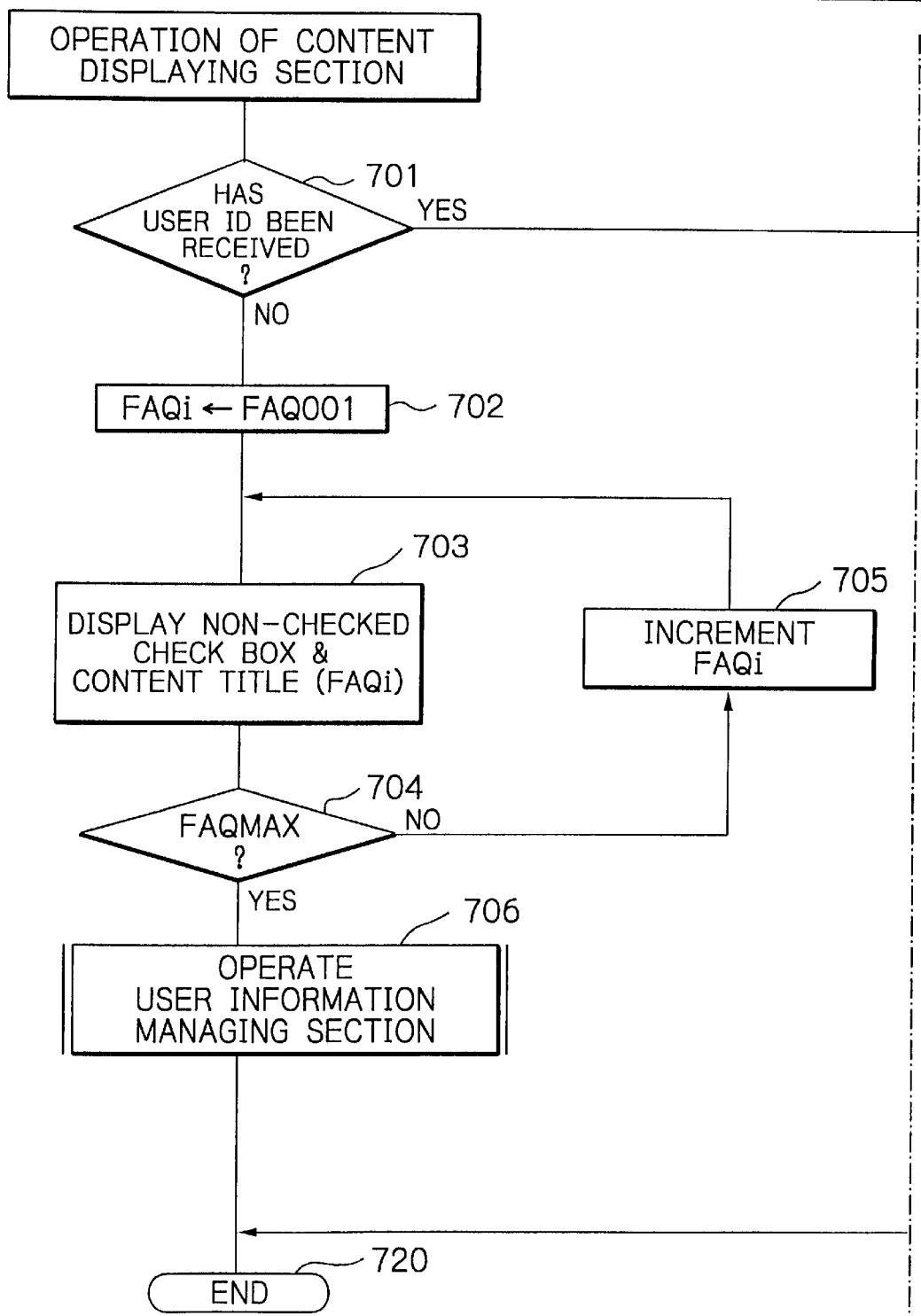

| USER ID | FINAL VISIT DATE | STATUS KEY FILEDS | | |
|---|---|---|---|---|
| | | FAQ 001 | ... | FAQ MAX |
| USER 1 ID | USER 1 FINAL VISIT DATE | STATUS KEY 1 | ... | STATUS KEY MAX |
| USER 2 ID | USER 2 FINAL VISIT DATE | STATUS KEY 1 | ... | STATUS KEY MAX |
| USER 3 ID | USER 3 FINAL VISIT DATE | STATUS KEY 1 | ... | STATUS KEY MAX |
| .. | .. | .. | ... | .. |
| USER n ID | USER n FINAL VISIT DATE | STATUS KEY 1 | ... | STATUS KEY MAX |

STATUS KEY = NUMBER OF ACCESSES = 0, 1, 2, ....

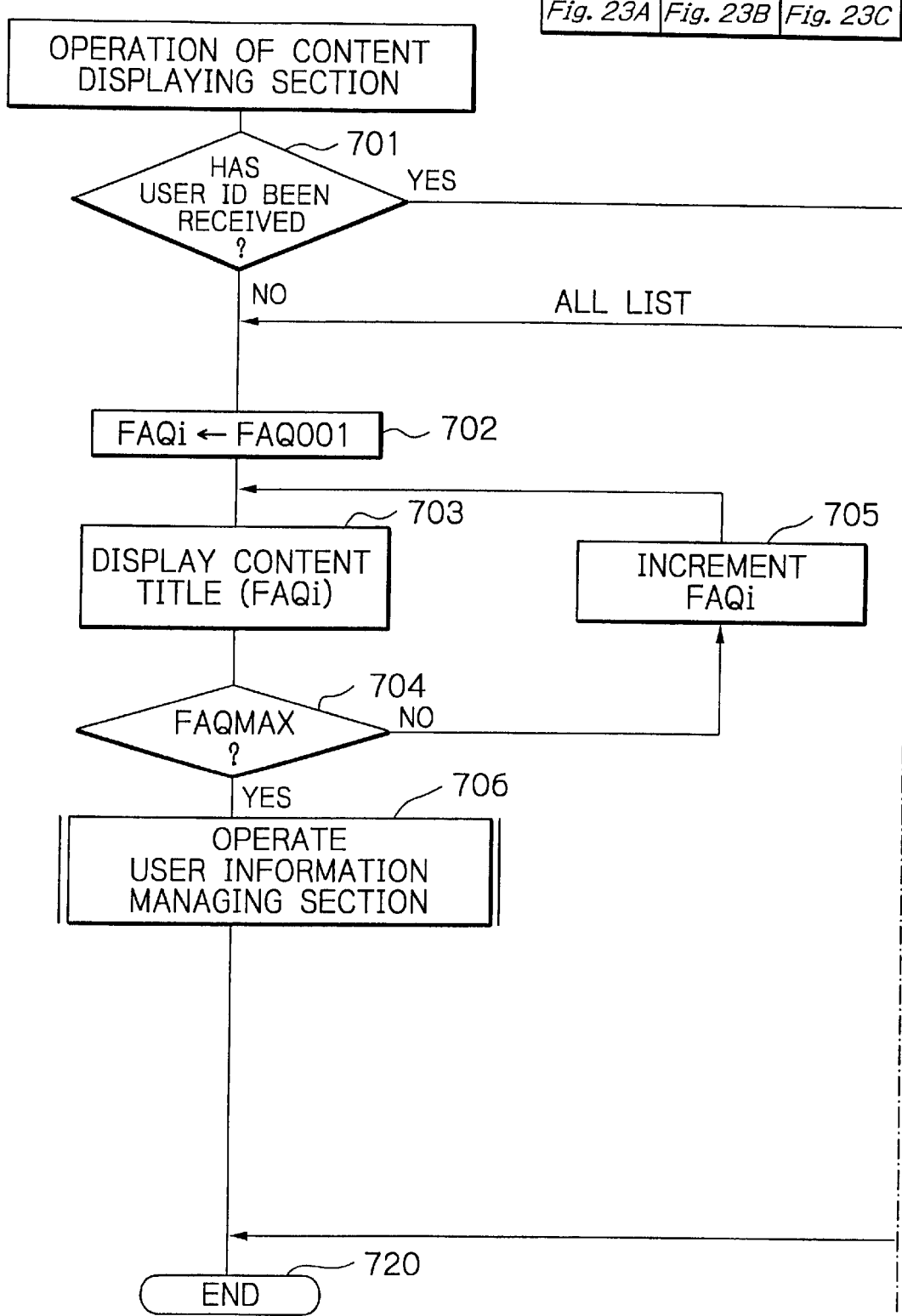

CONTENT PROVIDING SYSTEM CAPABLE OF REDUCING BURDEN ON USERS

BACKGROUND OF THE INVENTION

1. Field of the Invention

The present invention relates to a content providing system, and more particularly, to the improvement of displaying a content title list.

2. Description of the Related Art

A prior art content providing system is constructed by an Internet content provider server and user terminals connected through the Internet. In the prior art content providing system, the user operates the user terminal to continue feeding homepages until the user picks up a desired content. In this case, the user may continue scrolling the displayed page until the user picks up a desired content title. If the amount of content provided by the Internet content provider server is very large, the user can designate a retrieval condition using keywords. That is, the user inputs a keyword into a retrieval window of the user terminal to carry out a retrieval operation while the displayed homepage is fed or scrolled. As a result, a retrieval result is displayed on a retrieval result window (see: JP-A-11-85656). This will be explained later in detail.

In the prior art content providing system, however, since the displayed contents provided by the Internet content provider server are not customized for individual users, even if a retrieval operation by keywords is used, the users would take a long time to pick up a desired content title, which would increase the burden on the users.

SUMMARY OF THE INVENTION

It is an object of the present invention to provide a content providing system capable of reducing the burden on the users.

According to the present invention, in a content providing system including a content provider server connected between a network and a provider terminal, and user terminals connected to the network, the content provider server is constructed by a content managing table for storing contents along with content titles in correspondence with management identification (ID) numbers, a content managing section for managing the content managing table, a user information managing table for storing status keys showing access statuses of the stored content titles accessed by the user terminals in correspondence with user ID numbers thereof, a user information managing section for managing the user information managing table so as to set a respective one of the status keys when one of the user terminals accesses one of the stored content titles, and a content displaying section for displaying a content title list on the display unit of the one of the user terminals in accordance with the status keys belonging to the user ID number of the one of the user terminals.

Also, in the present invention, access numbers of the stored content titles accessed by the user terminals are provided instead of the access statuses of the stored content titles accessed by the user terminals. Thus, a content title list depending on the access numbers can be obtained.

Further, in the present invention, registered dates as well as content items are stored in correspondence with the management ID numbers, and final visit dates as access statuses are stored in correspondence with the user ID numbers. Thus, a content title list depending on the registered dates of the content items and the final visit dates of the user terminals can be obtained.

BRIEF DESCRIPTION OF THE DRAWINGS

The present invention will be more clearly understood from the description set forth below, as compared with the prior art, with reference to the accompanying drawings, wherein:

FIG. 3 is a detailed diagram of the content managing table of FIG. 2;

FIG. 6 is a detailed diagram of the user information managing table of FIG. 2;

FIG. 15 is a detailed diagram of the content managing table of FIG. 14;

DESCRIPTION OF THE PREFERRED EMBODIMENTS

Before the description of the preferred embodiments, a prior art content providing method will be explained with reference to FIG. 1 (see: JP-A-11-85656).

Figure 1:
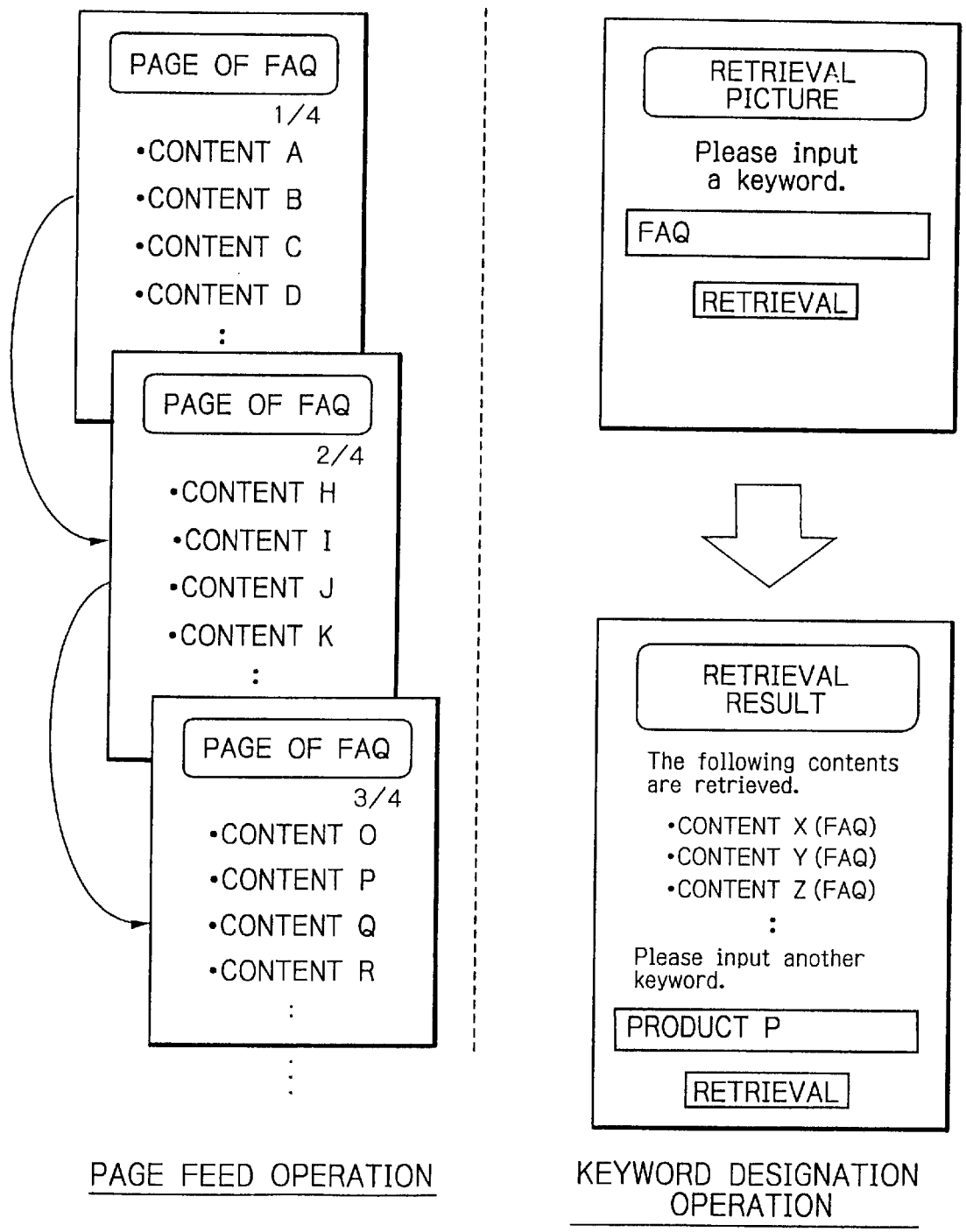
FIG. 1 is a diagram showing a prior art content providing method.

In FIG. 1, the left side shows a page feed operation by the user. That is, the user continues feeding pages of frequently asked questions (FAQ) until the user picks up a desired content title. In this case, the user may continue scrolling the displayed page of FAQ until the user picks up the desired content title. If the amount of contents provided by an Internet content provider is very large, the user can designate a retrieval condition using keywords. That is, as shown in the right side of FIG. 1 which shows a keyword designation operation, the user inputs a keyword into a retrieval window to carry out a retrieval operation while the displayed page is fed or scrolled. As a result, a retrieval result is displayed on a retrieval result window. In this case, when the amount of retrieved content titles is still large, the user may input another keyword into the retrieval window to carry out another retrieval operation.

In the content providing method as illustrated in FIG. 1, however, since the displayed content titles provided by the Internet content provider are not customized for individual users, even if retrieval operations by keywords are used, the users would take a long time to pick up a desired content title, which would increase the burden on the users.

Figure 2:
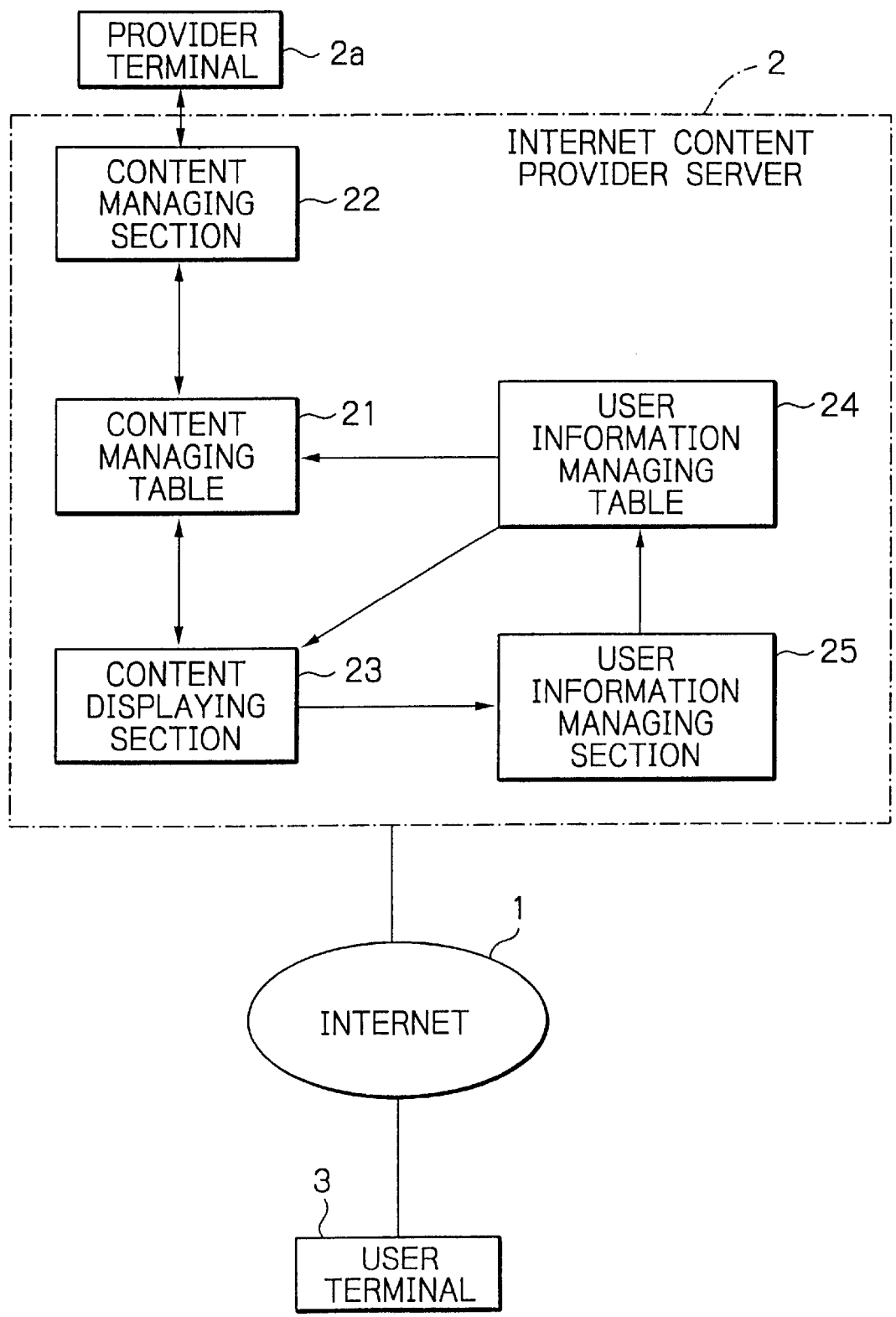
FIG. 2 is a block circuit diagram illustrating a first embodiment of the content providing system according to the present invention.

In FIG. 2, which illustrates a first embodiment of the content providing system according to the present invention, reference numeral 1 designates the Internet to which an Internet content provider server 2 and a user terminal 3 are connected. Note that the Internet 1 can be replaced by a dedicated line or the like. Also, the user terminal 3 is a terminal which can be handled by an unidentified person and has a world wide web (WWW) browser or the like capable of accessing homepages through the Internet 1. Note that other user terminals (not shown) are also connected to the Internet 1.

The Internet content provider server 2 is constructed by a content managing table 21, a content managing section 22 for managing the content managing table 21, a content displaying section 23 for displaying the content of the content managing table 21 on the display unit of the user terminal 3 upon receipt of the user's request, a user information managing table 24 for storing user information, and a user information managing section 25 for managing the user information managing table 24. The content managing section 22 is connected to a provider terminal 2a.

In FIG. 3, which is a detailed diagram of the content managing table 21 of FIG. 2, the content managing table 21 is formed by a management ID number item, a registered date item and a content item including a content title and content data. That is, each content item along with its registered date is stored in the content managing table 21 in correspondence with a management ID number which is pre-al located thereto. In this case, if the content data is renewed, its registered date is a renewal date.

Figure 4:
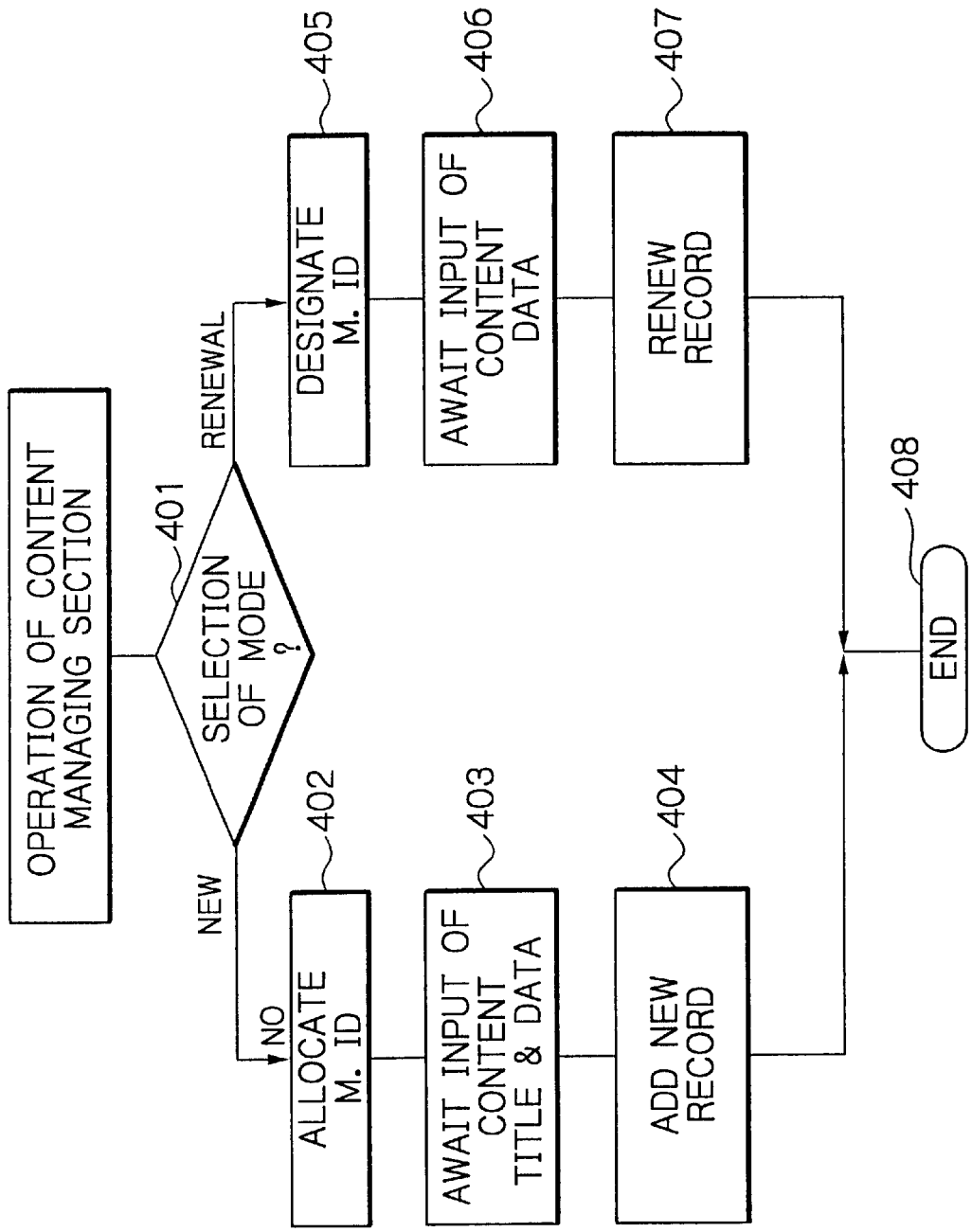
FIG. 4 is a flowchart showing the operation of the content managing section of FIG. 2.

The operation of the content managing section 22 of FIG. 2 is explained next with reference to the flowchart of FIG. 4 as well as FIG. 5 which is a partial diagram of the system of FIG. 2, i.e., the content managing table 21, the content managing section 22 and the display unit of the provider user 2a.

First, referring to step 401, it is determined whether a mode to be processed is a new registration or a renewal in accordance with the request of the provider terminal 2a. If the mode to be processed is a new registration, the control proceeds to step 402. On the other hand, if the mode to be processed is a renewal, the control proceeds to step 405.

Figure 5:
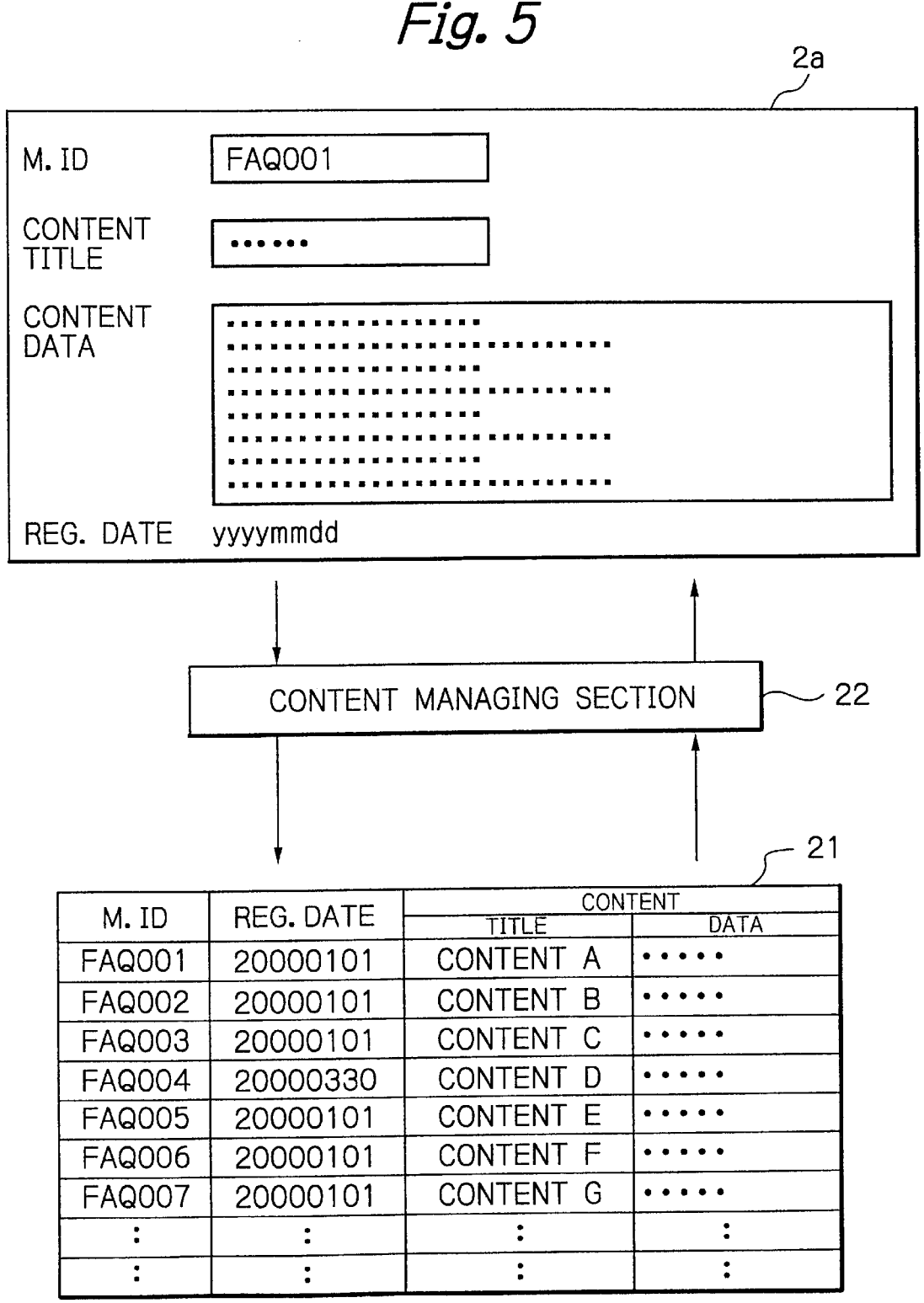
FIG. 5 is a partial diagram of the system of FIG. 2 for supplementing the flowchart of FIG. 4.

At step 402, a management ID number such as FAQ001 is automatically allocated, as shown in FIG. 5. Then, at step 403, the content managing section 22 awaits the input of an content item such as a content title and content data along with its registered date from the provider terminal 2a, as shown in FIG. 5. After the content item is input, at step 404, the content managing section 22 adds a new record to the content managing table 21. In this case, the new record is formed by content title and data along with its registered date in correspondence with the management ID number.

On the other hand, at step 405, a management ID number such as FAQ001 is designated by the provider terminal 2a, as shown in FIG. 5. Then, at step 406, the content managing section 22 awaits the input of content along with its renewal date from the provider terminal 2a, as shown in FIG. 5. After the content data is input, at step 407, the content managing section 22 renews the corresponding record of the content managing table 21 belonging to the designated ID number. In this case, the renewed record is formed by content data along with its renewal date in correspondence with the management ID number.

Thus, the operation of the content managing section 22 is completed by step 408.

In FIG. 6, which is a detailed diagram of the user information managing table 24 of FIG. 2, the user information managing table 24 is formed by a user ID number item, a final visit date item and status key fields. Note that status keys 1, 2, . . . , MAX of the status key fields correspond to the management ID numbers FAQ001, FAQ002, . . . , FAQMAX, i.e., content 1, 2, . . . , MAX, respectively. That is, the status keys of each user, i.e., each user terminal along with its final visit date to the homepages of the Internet content provider server 2 are stored in the user information managing table 24 in correspondence with a user ID number which is pre-allocated to the user terminal. In this case, each of the status keys is "S" or "Δ(space)".

The operation of the content displacing section 23 of FIG. 2 is explained next with reference to the flowcharts of FIGS. 7, 8, 9 and 10 as well as FIGS. 11, 12 and 13 which are partial diagrams of the system of FIG. 2.

First, at step 701, it is determined whether or not a user ID number from the user terminal 3 has been received. As a result, if such a user ID number has not been received, the control proceeds to steps 702 through 706. On the other hand, if such a user ID number has been received, the control proceeds to steps 707 through 719.

Steps 702 through 705 are explained next by using FIG. 11.

At step 702, the initial number FAQ001 is set in a management ID number FAQi.

Next, at step 703, the content title along with a non-checked check box belonging to the management ID number FAQi is displayed on the display unit of the user terminal 3.

Next, at step 704, it is determined whether or not FAQi is the maximum management ID number FAQMAX. Only when FAQi is FAQMAX, does the control proceed to step 706. Otherwise, the control proceeds to step 705 which increments the management ID number FAQi, thus repeating the operation at steps 703 and 704.

At step 706, the content display section 23 operates the user information managing section 25.

Figure 7B:
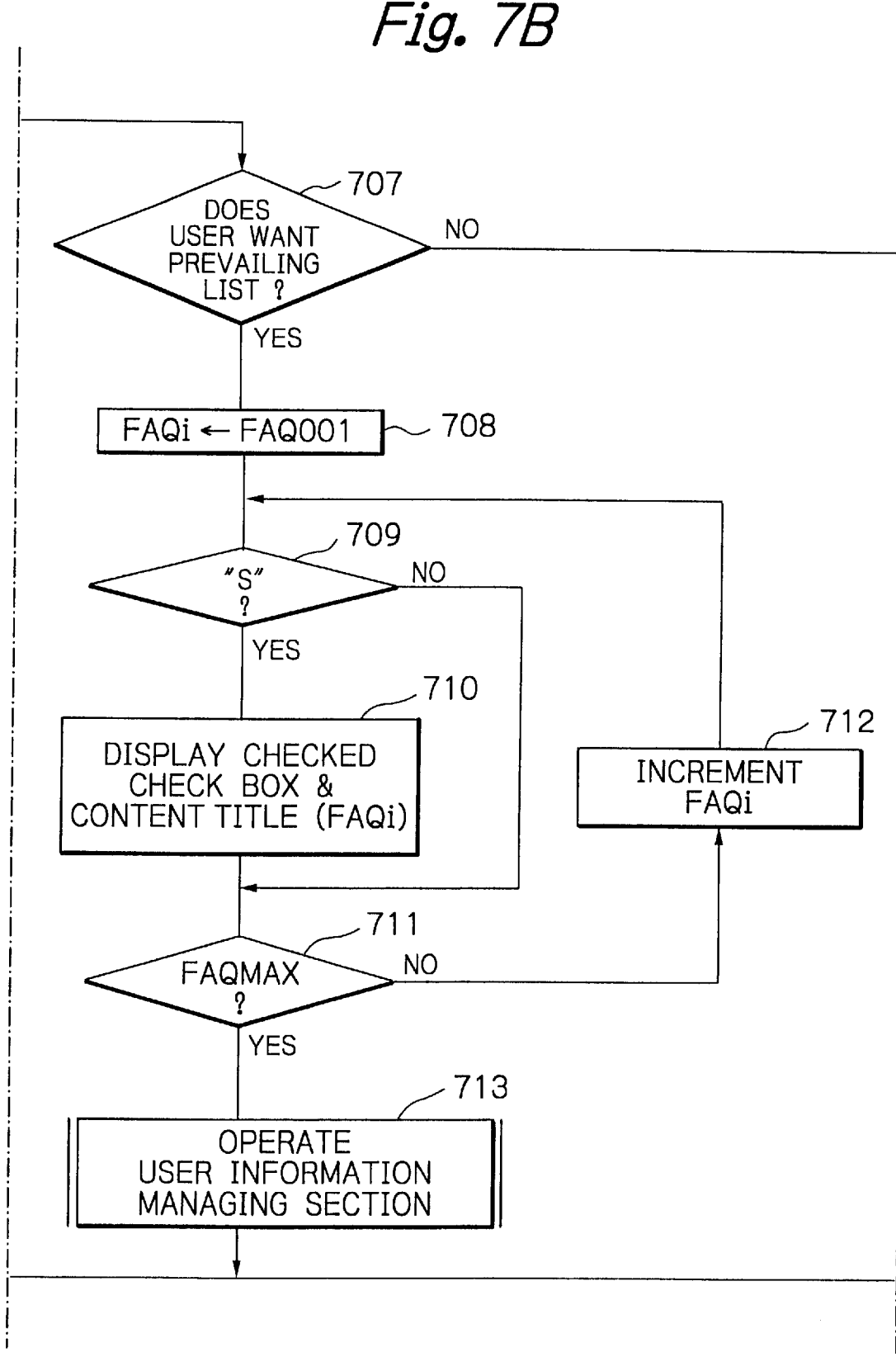
FIG. 7 is a flowchart showing the operation of the content managing section of FIG. 2.
Figure 7C:
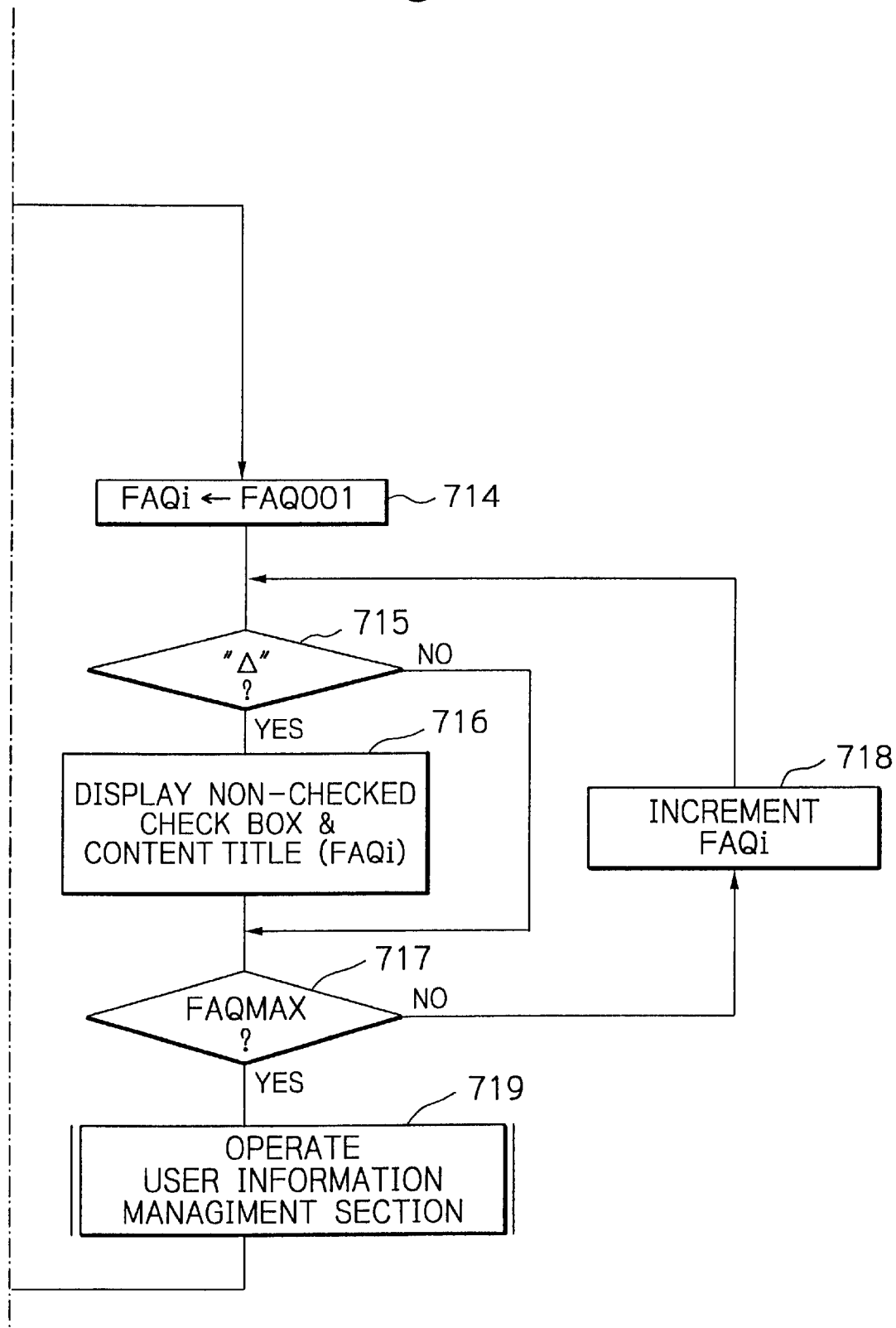
Figure 8:
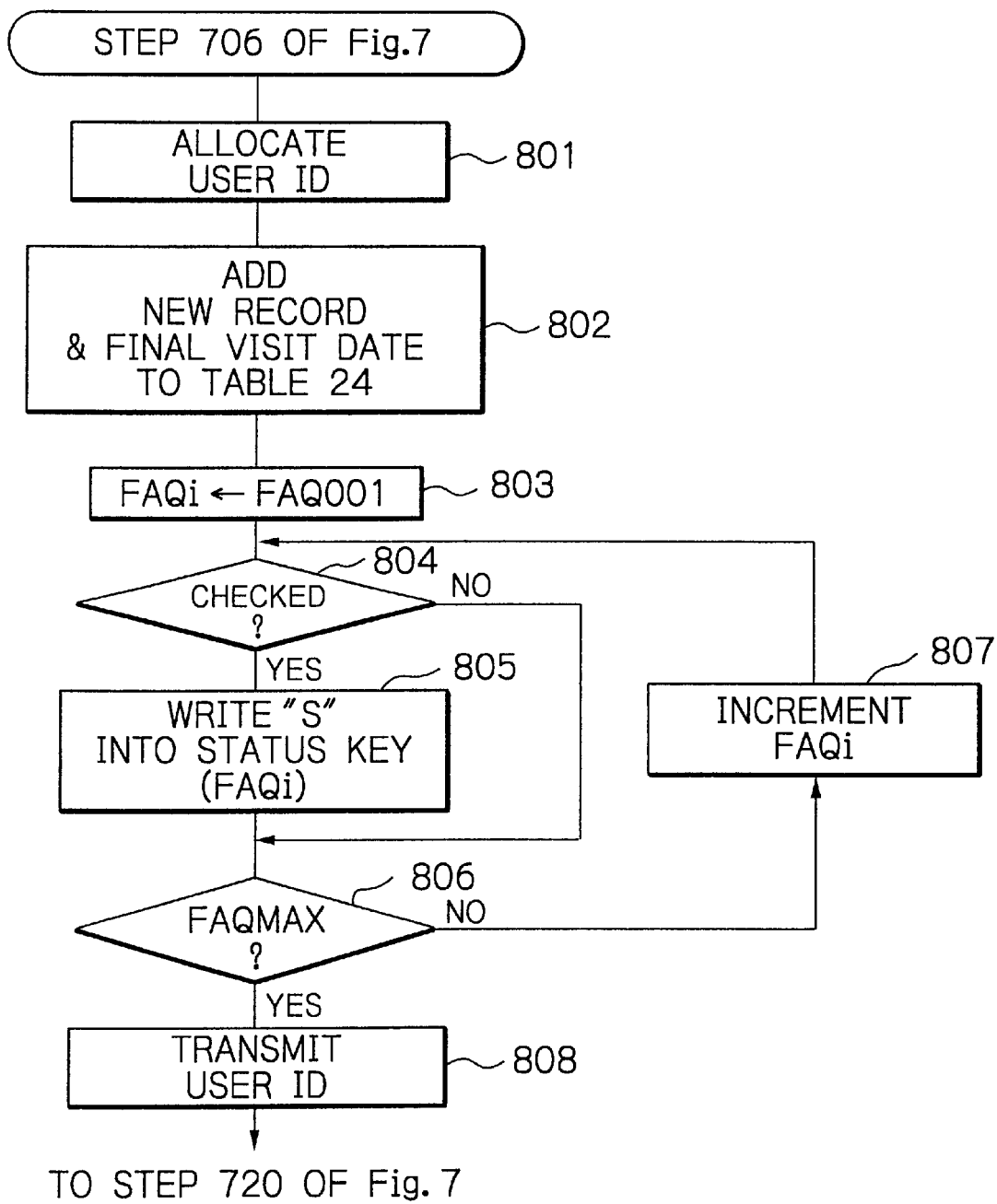
FIGS. 8, 9 and 10 are detailed flowcharts of steps 709, 719 and 728 of FIG. 7.
Figure 12:
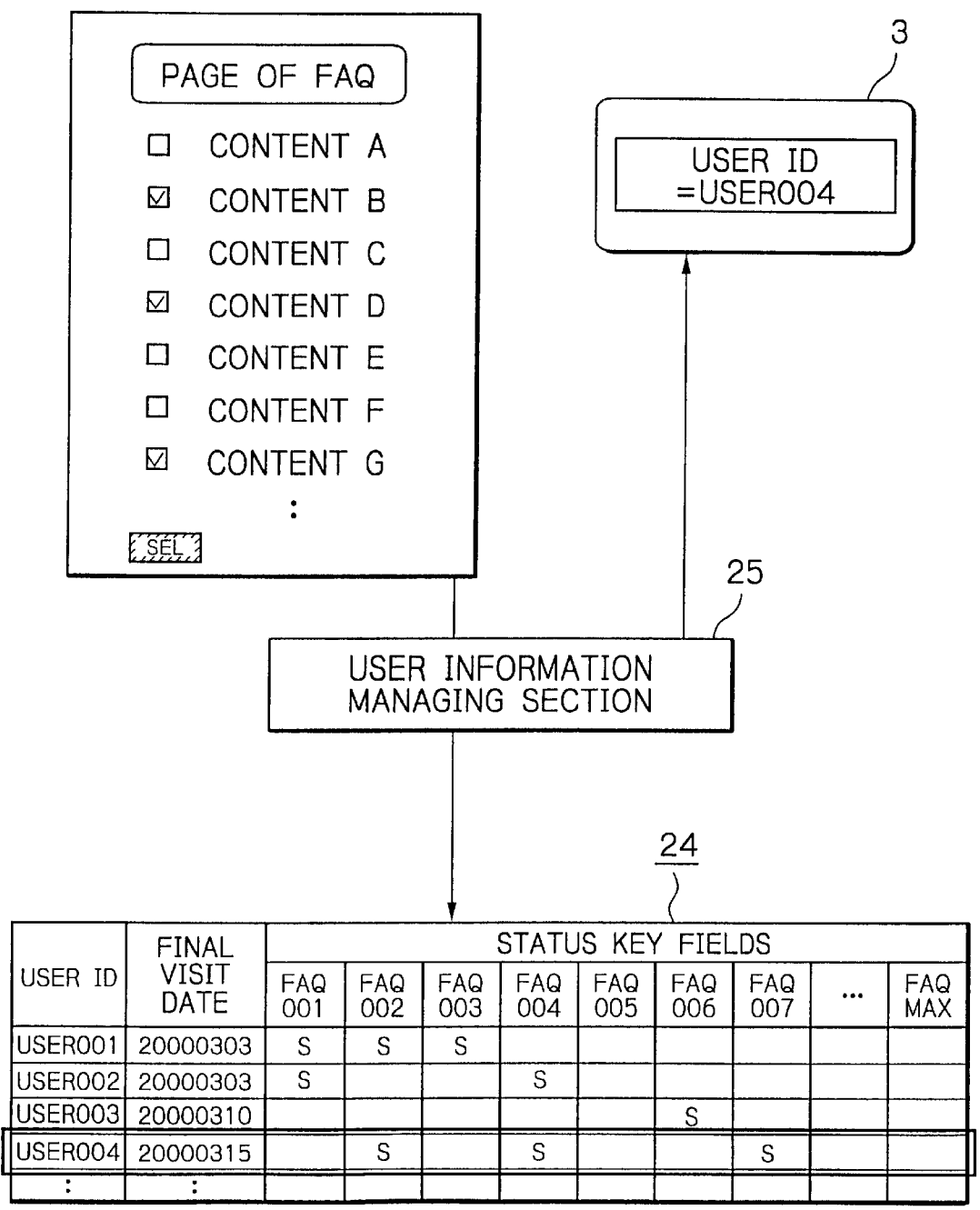
Figure 13:
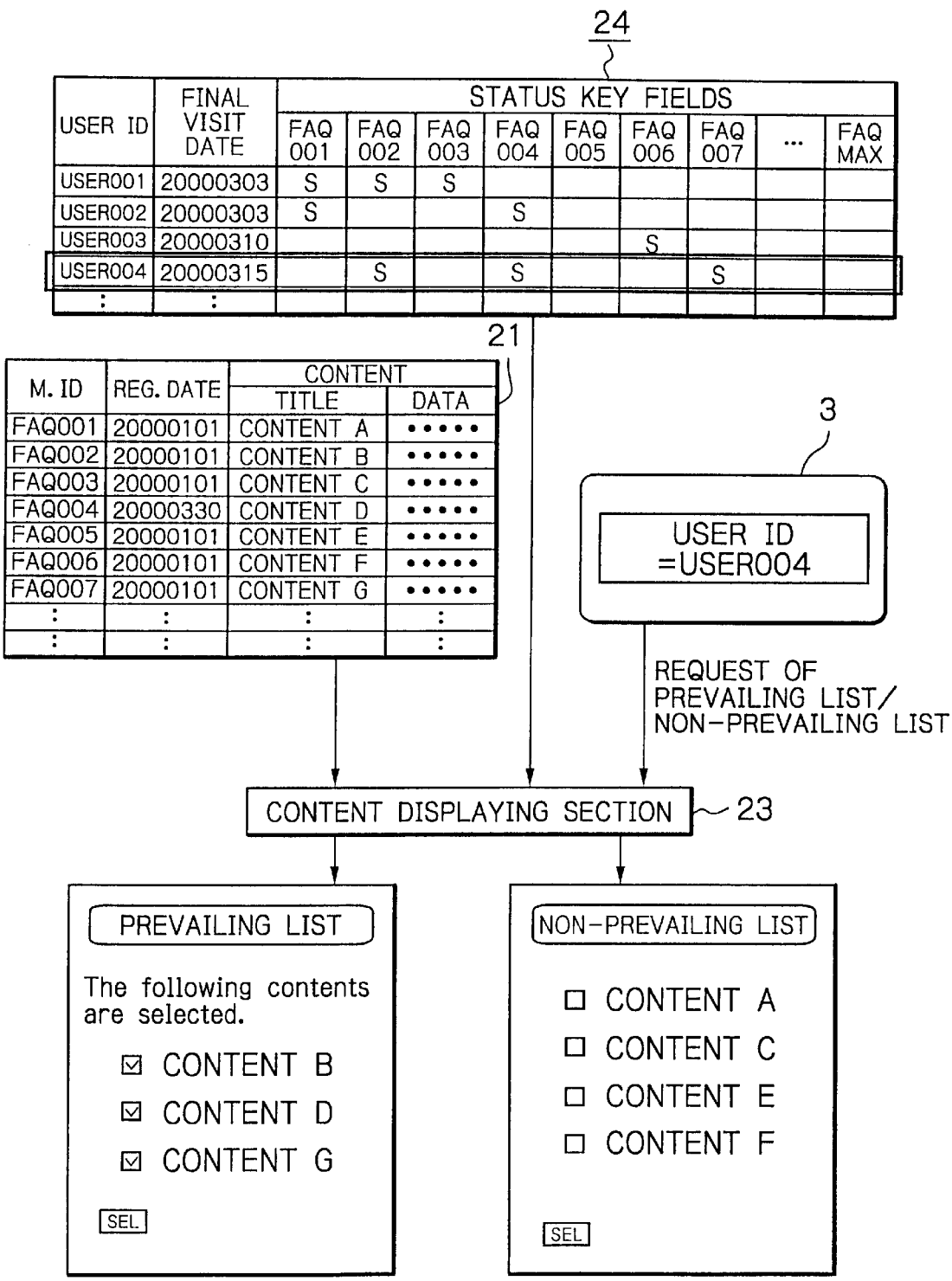

The operation of the user information managing section 25 at step 706 of FIG. 7 is shown in the flowchart of FIG. 8 as well as FIG. 12 which is a partial diagram of the system of FIG. 2.

First, at step 801, the user information managing section 25 allocates a user ID number such as USER004 for the user terminal 3.

Next, at step 802, the user information managing section 25 adds a new record to the user information managing table 24. In this case, the new record is formed by status key information along with the visit date in correspondence with the user ID number. In FIG. 12, note that a status key "S" designates a selection state, while a status key "Δ(space)" designates a non-selection state.

Next, at step 803, the initial number FAQ001 is set in a management ID number FAQi.

Next, at step 804, it is determined whether or not the check box of the content title belonging to the management ID number FAQi has been checked. Only when this check box has been checked, does the control proceed to step 805 which writes "S" into the status key of the management ID number FAQi belonging to the allocated user ID number. Otherwise, the control proceeds directly to step 806.

At step 806, it is determined whether or not FAQi is the maximum management ID number FAQMAX. Only when FAQi is FAQMAX, does the control proceed to step 808. Otherwise, the control proceeds to step 807 which increments the management ID number FAQi, thus repeating the operation at steps at steps 804, 805 and 806.

At step 808, the user information managing section 25 transmits the allocated user ID number to the user terminal 3.

Then, the control returns to step 720 of FIG. 7.

Figure 11:
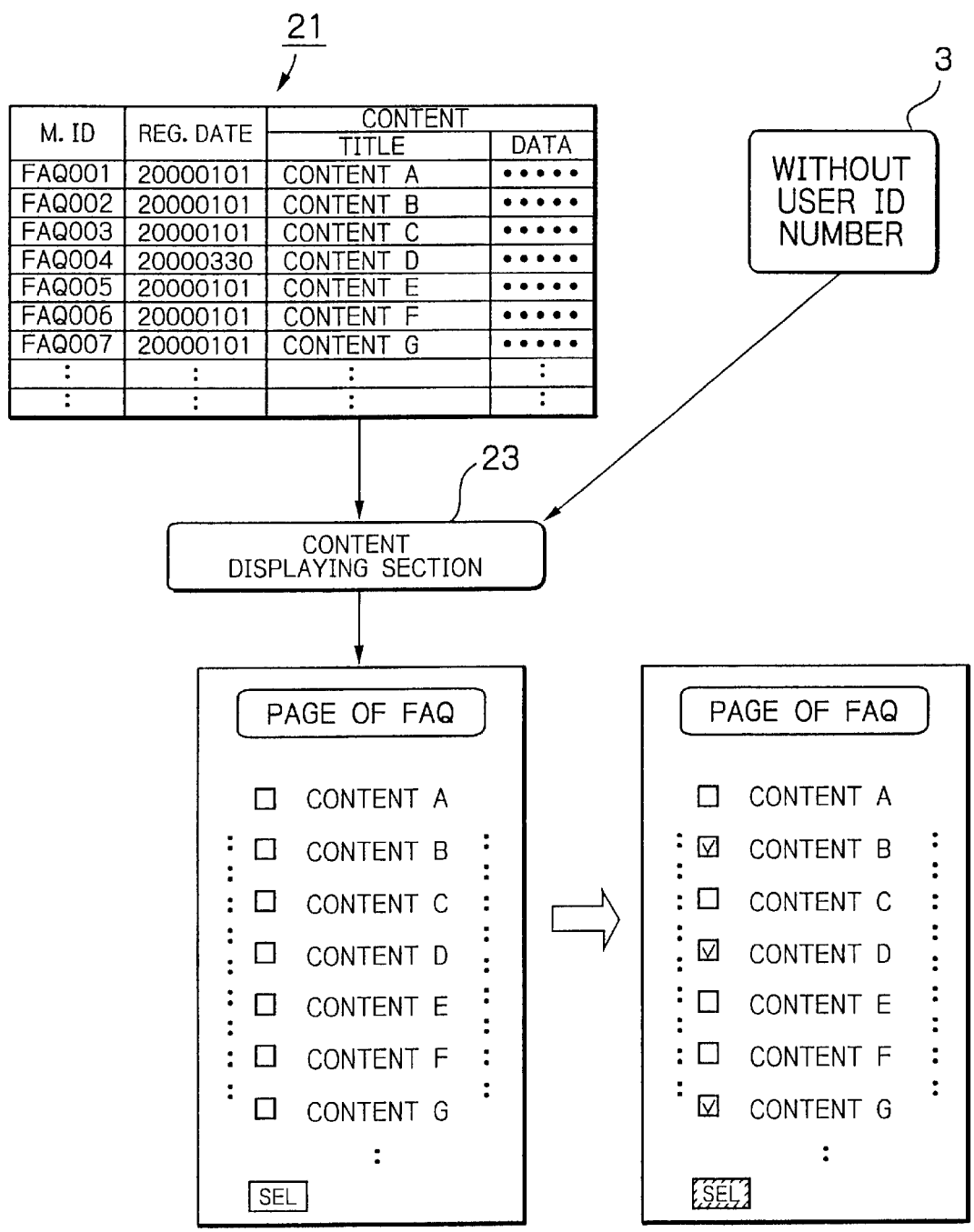
FIGS. 11, 12 and 13 are partial diagrams of the system of FIG. 2 for supplementing the flowchart of FIG. 7.

In FIG. 11, the check boxes of the contents B, D and G are newly checked. As a result, as shown in FIG. 12, "S" is written into the status keys of FAQ002, FAQ004 and FAQ007 belonging to the user ID number USER004.

Returning to FIG. 7, at step 707, it is determined whether the user terminal 3 requests a prevailing list of content titles which have been accessed by the user or a non-prevailing list of content titles which have not been accessed yet by the user. If the user terminal 3 requests a prevailing title list, the control proceeds to steps 708 through 713. On the other hand, if the user terminal 3 requests a non-prevailing title list, the control proceeds to steps 714 through 719.

Steps 708 through 712 are explained next by using FIG. 13.

At step 708, the initial number FAQ001 is set in a management ID number FAQi.

Next, at step 709, it is determined whether or not the status key of the management ID number FAQi belonging to the user ID number USER004 is "S". As a result, only when this status key is "S", does the control proceed to step 710 which displays the cotent title of FAQi along with a checked check box belonging to the user ID number USER004. Otherwise, the control proceeds directly to step 711.

At step 711, it is determined whether or not FAQi is the maximum management ID number FAQMAX. Only when FAQi is FAQMAX, does the control proceed to step 713. Otherwise, the control proceeds to step 712 which increments the management ID number FAQi, thus repeating the operation at steps 709, 710 and 711. For example, a prevailing title list of the content B, D and G are displayed by steps 708 to 712 on the display unit of the user terminal 3.

At step 713, the content display section 23 operates the user information managing section 25.

Figure 9:
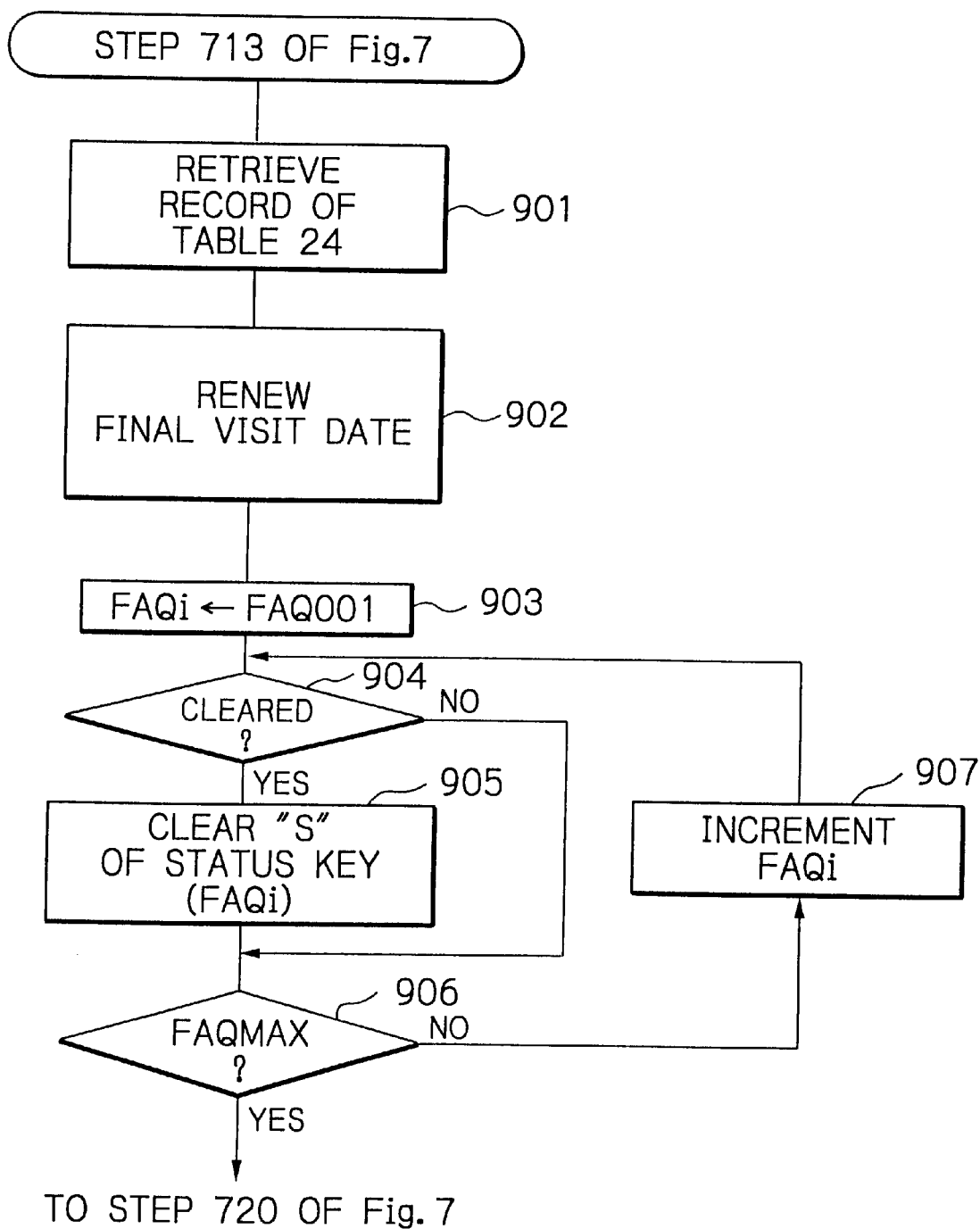

The operation of the user information managing section 25 at step 713 of FIG. 7 is shown in the flowchart of FIG. 9.

First, at step 901, the user information managing section 25 retrieves the record of the user information managing table 24 using the user ID number such as USER004 for the user terminal 3.

Next, at step 902, the user information managing section 25 renews the final visit date in correspondence with the user ID number such as USER004.

Next, at step 903, the initial number FAQ001 is set in a management ID number FAQi.

Next, at step 904, it is determined whether or not the check box of the content title belonging to the management ID number FAQi has been cleared. Only when this check box has been cleared, does the control proceed to step 905 which clears "S" of the status key of the management ID number FAQi belonging to the allocated user ID number. Otherwise, the control proceeds directly to step 906.

At step 906, it is determined whether or not FAQi is the maximum management ID number FAQMAX. Only when FAQi is FAQMAX, does the control proceed to step 720 of FIG. 7. Otherwise, the control proceeds to step 907 which increments the management ID number FAQi, thus repeating the operation at steps at steps 904, 905 and 906.

Then, the control returns to step 729 of FIG. 7.

Steps 714 through 718 are explained next by using FIG. 13, too.

At step 714, the initial number FAQ001 is set in a management ID number FAQi.

Next, at step 715, it is determined whether or not the status key of the management ID number FAQi belonging to the user ID number USER004 is "Δ(space)". As a result, only when this status key is "Δ(space)", does the control proceed to step 716 which displays the cotent title of FAQi along with a checked non-check box belonging to the user ID number USER004. Otherwise, the control proceeds directly to step 717.

At step 717, it is determined whether or not FAQi is the maximum management ID number FAQMAX. Only when FAQi is FAQMAX, does the control proceed to step 719. Otherwise, the control proceeds to step 718 which increments the management ID number FAQi, thus repeating the operation at steps 715, 716 and 717. For example, a non-prevailing title list of the content A, C, E and F are displayed by steps 714 to 718 on the display unit of the user terminal 3.

At step 719, the content display section 23 operates the user information managing section 25.

Figure 10:
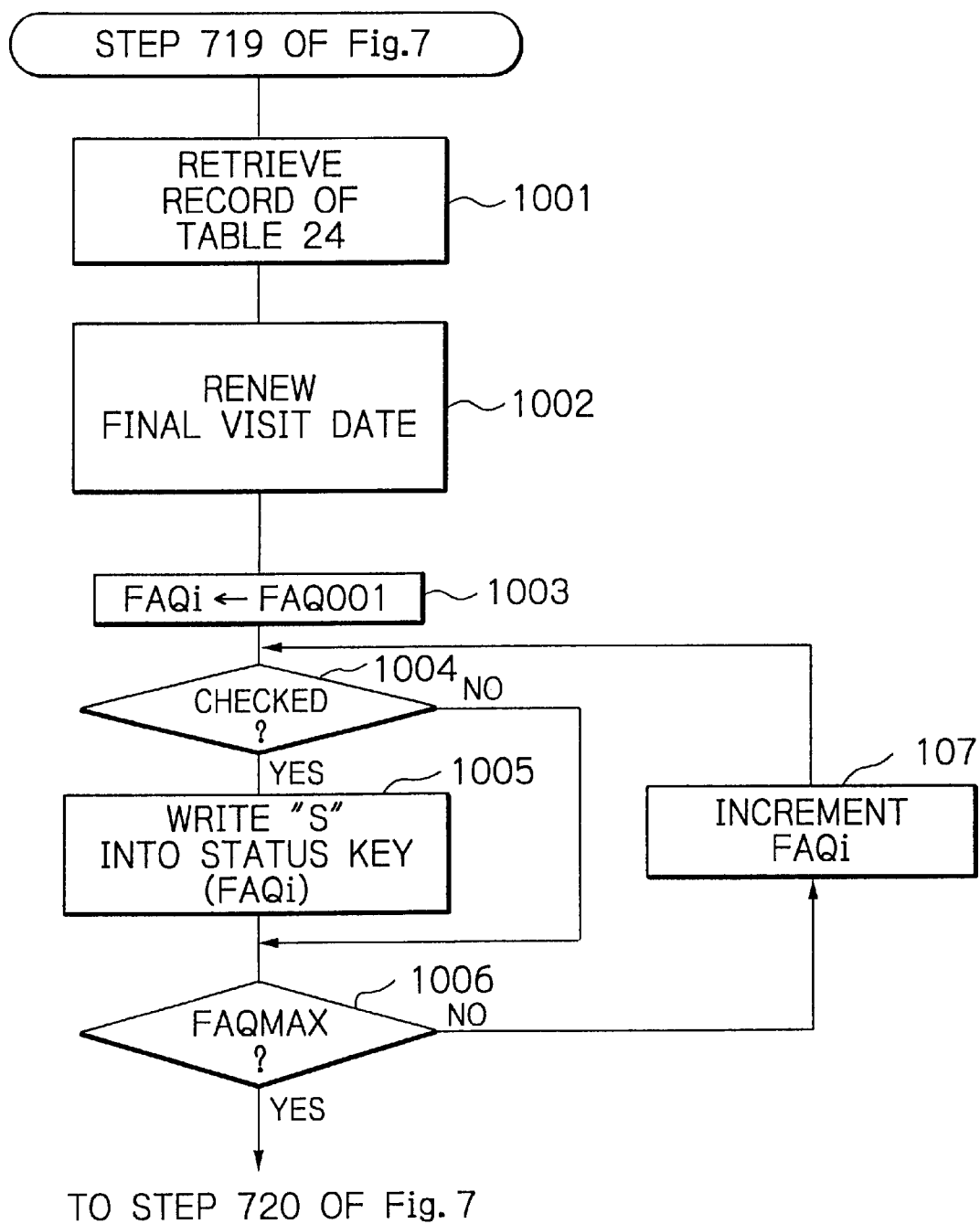

The operation of the user information managing section 25 at step 719 of FIG. 7 is shown in the flowchart of FIG. 10.

First, at step 1001, the user information managing section 25 retrieves the record of the user information managing table 24 using the user ID number such as USER004 for the user terminal 3.

Next, at step 1002, the user information managing section 25 renews the final visit date in correspondence with the user ID number such as USER004.

Next, at step 1003, the initial number FAQ001 is set in a management ID number FAQi.

Next, at step 1004, it is determined whether or not the check box of the content title belonging to the management ID number FAQi has been checked. Only when this check box has been checked, does the control proceed to step 1005 which writes "S" into the status key of the management ID number FAQi belonging to the allocated user ID number. Otherwise, the control proceeds directly to step 1006.

At step 1006, it is determined whether or not FAQi is the maximum management ID number FAQMAX. Only when FAQi is FAQMAX, does the control proceed to step 720 of FIG. 7. Otherwise, the control proceeds to step 1007 which increments the management ID number FAQi, thus repeating the operation at steps at steps 1004, 1005 and 1006.

Figure 14:
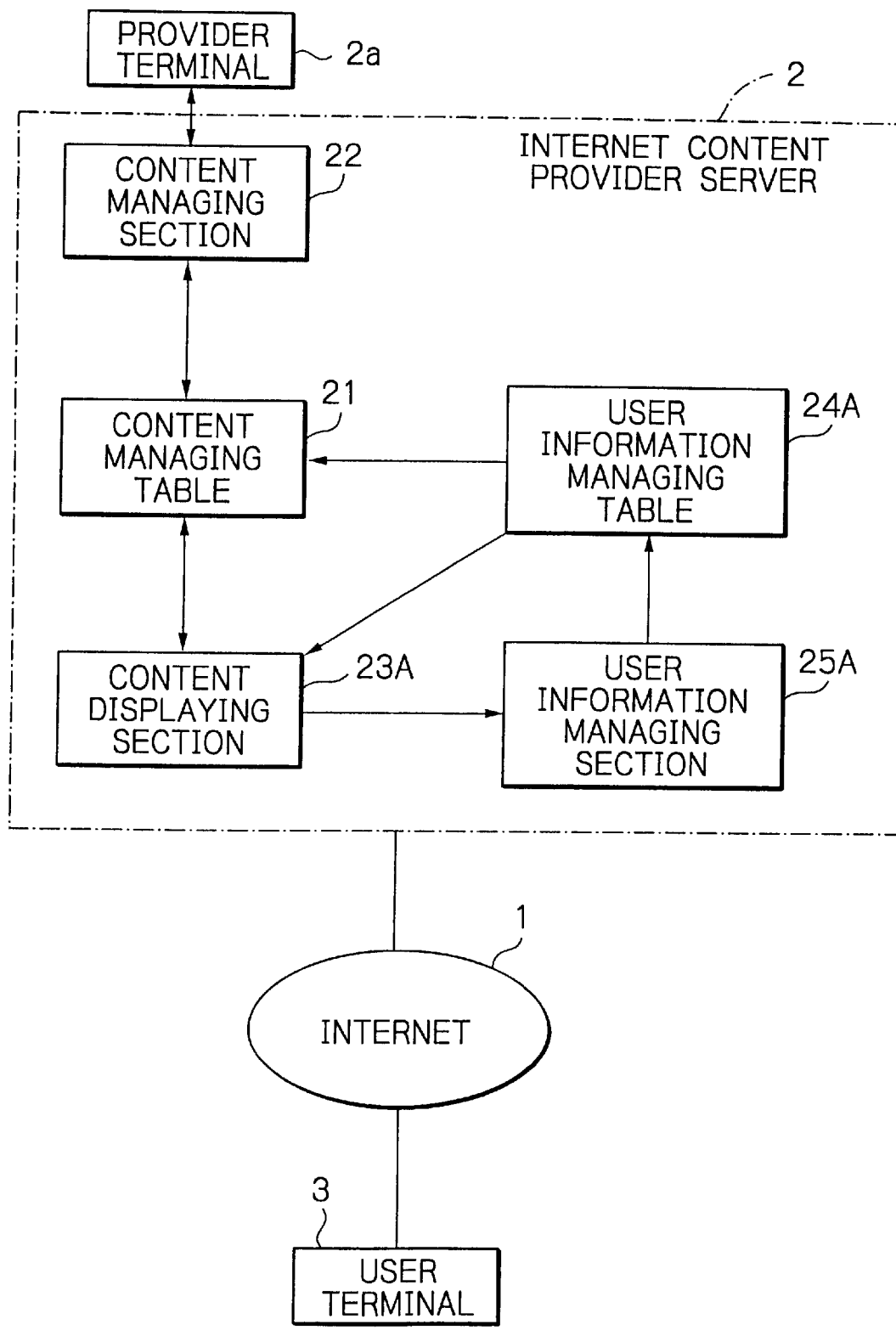
FIG. 14 is a block circuit diagram illustrating a second embodiment of the content providing system according to the present invention.

In FIG. 14, which illustrates a second embodiment of the content providing system according to the present invention, a content displaying section 23A, a user information managing table 24A and a user information managing section 25A are provided instead of the content displaying section 23, the user information managing table 24 and the user information managing section 25, respectively, of FIG. 2, thus providing a prevailing list of content in accordance with the numbers of accesses to the content by the user terminal 3.

In FIG. 15, which is a detailed diagram of the user information managing table 24A of FIG. 14, the user information managing table 24A has the same configuration as the user information managing table 24 of FIG. 6, except that each of the status keys is 0, 1, 2, . . . , which shows the number of accesses to the content belonging to the management ID number FAQi by the respective user.

The operation of the content displaying section 23A of FIG. 14 is explained next with reference to the flowcharts of FIGS. 16, 17 and 18 as well as FIGS. 19, 20 and 21 which are partial diagrams of the system of FIG. 14.

Steps 1601 through 1604 are carried out in a similar way to steps 701 through 705 in FIG. 7. In this case, steps 1602 through 1605 are explained with reference to FIG. 19 where content titles are displayed without check boxes.

At step 1606, the content display section 23A operates the user information managing section 25A.

Figure 16:
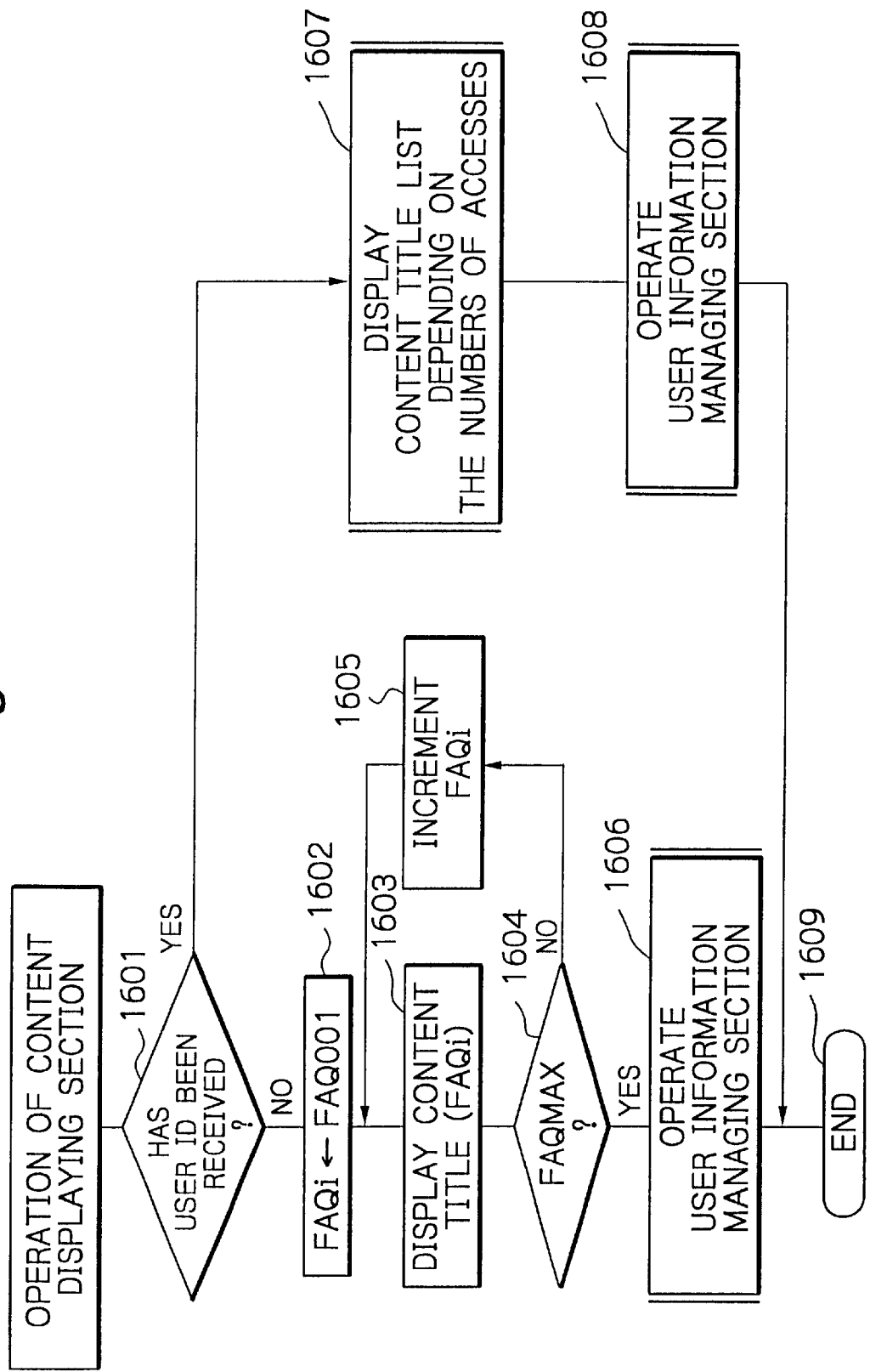
FIG. 16 is a flowchart showing the operation of the content managing section of FIG. 14.
Figure 17:
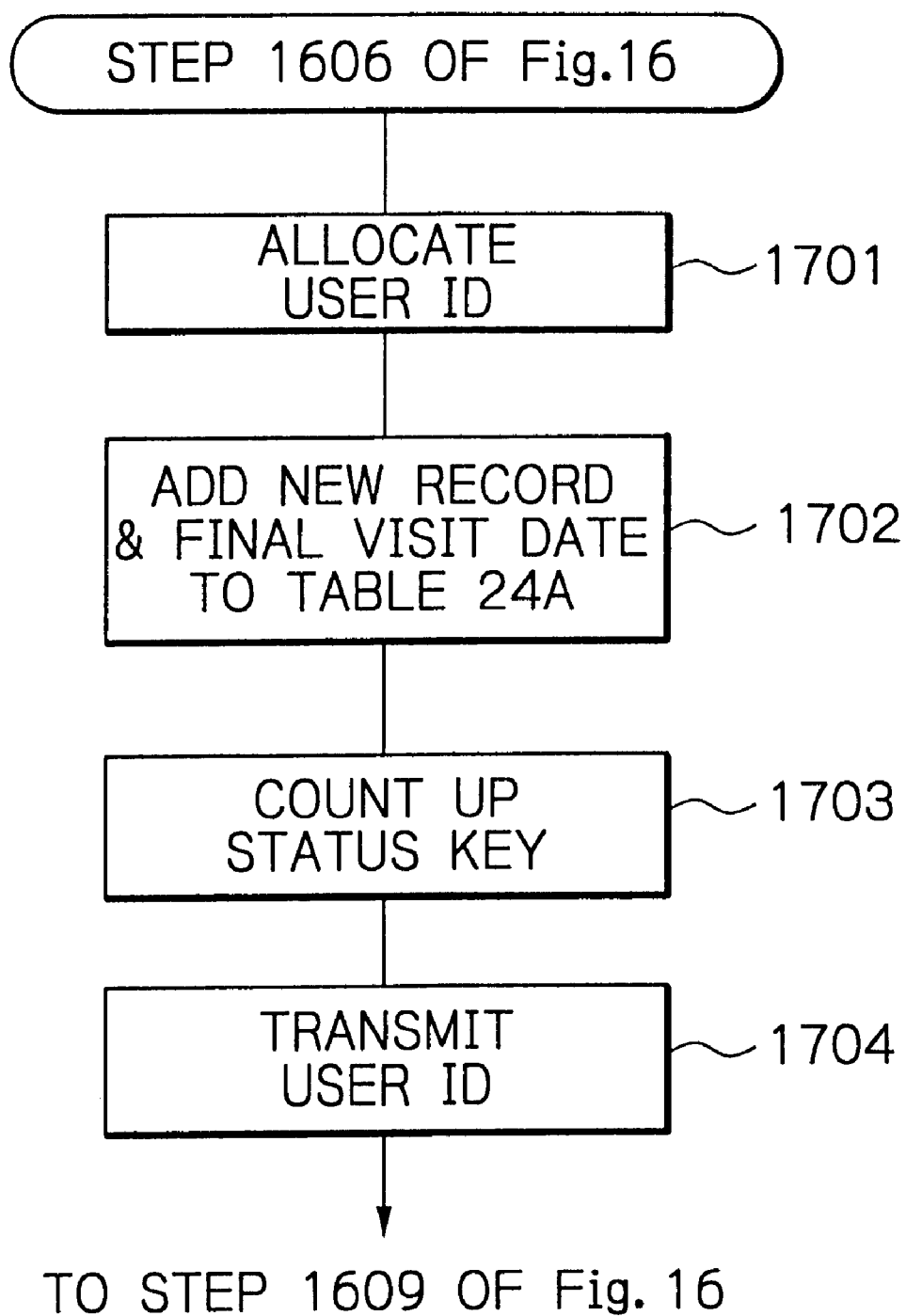
FIGS. 17 and 18 are detailed flowcharts of steps 709A, 1606 and 1608, respectively, of FIG. 16.
Figure 20:
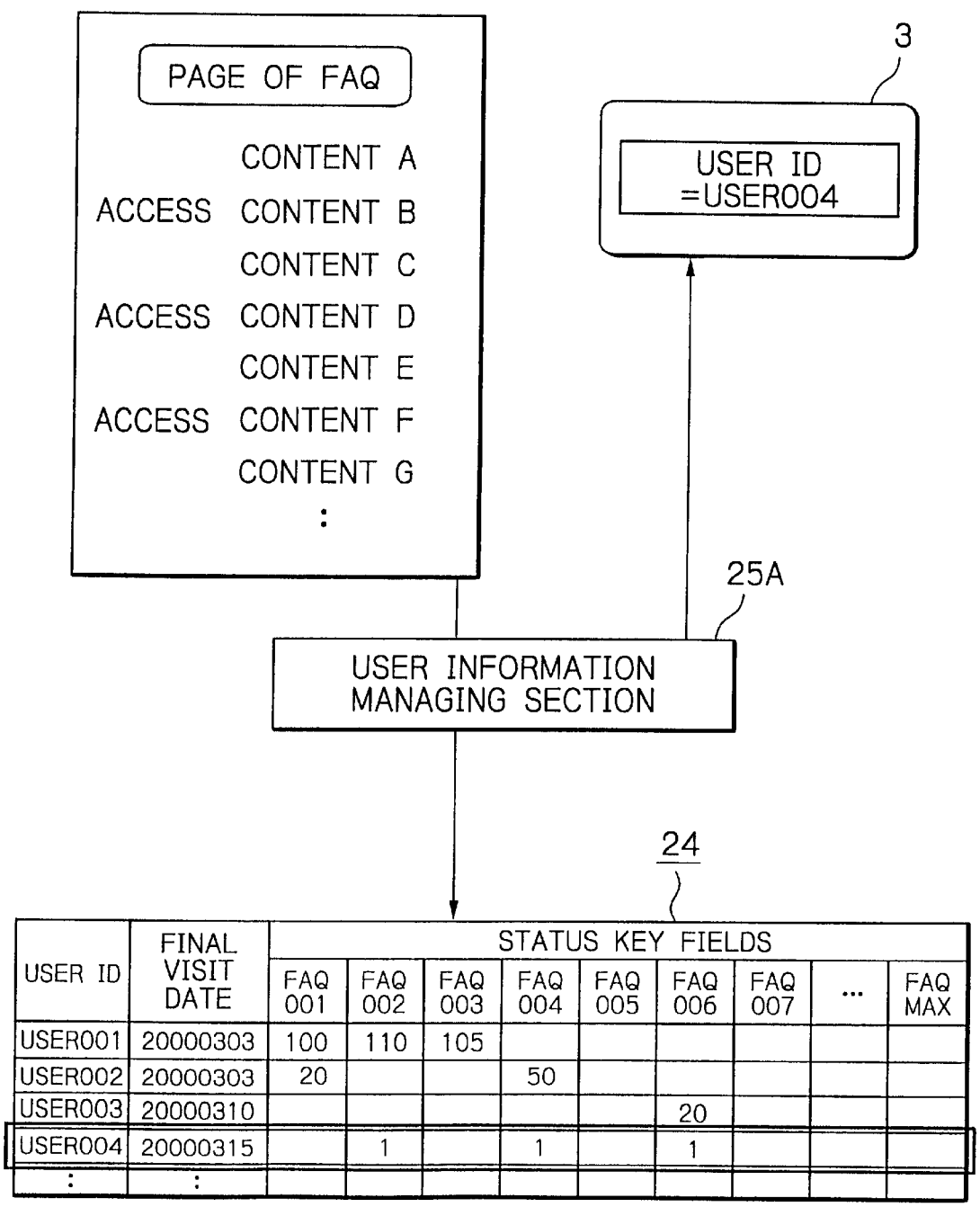
Figure 21:
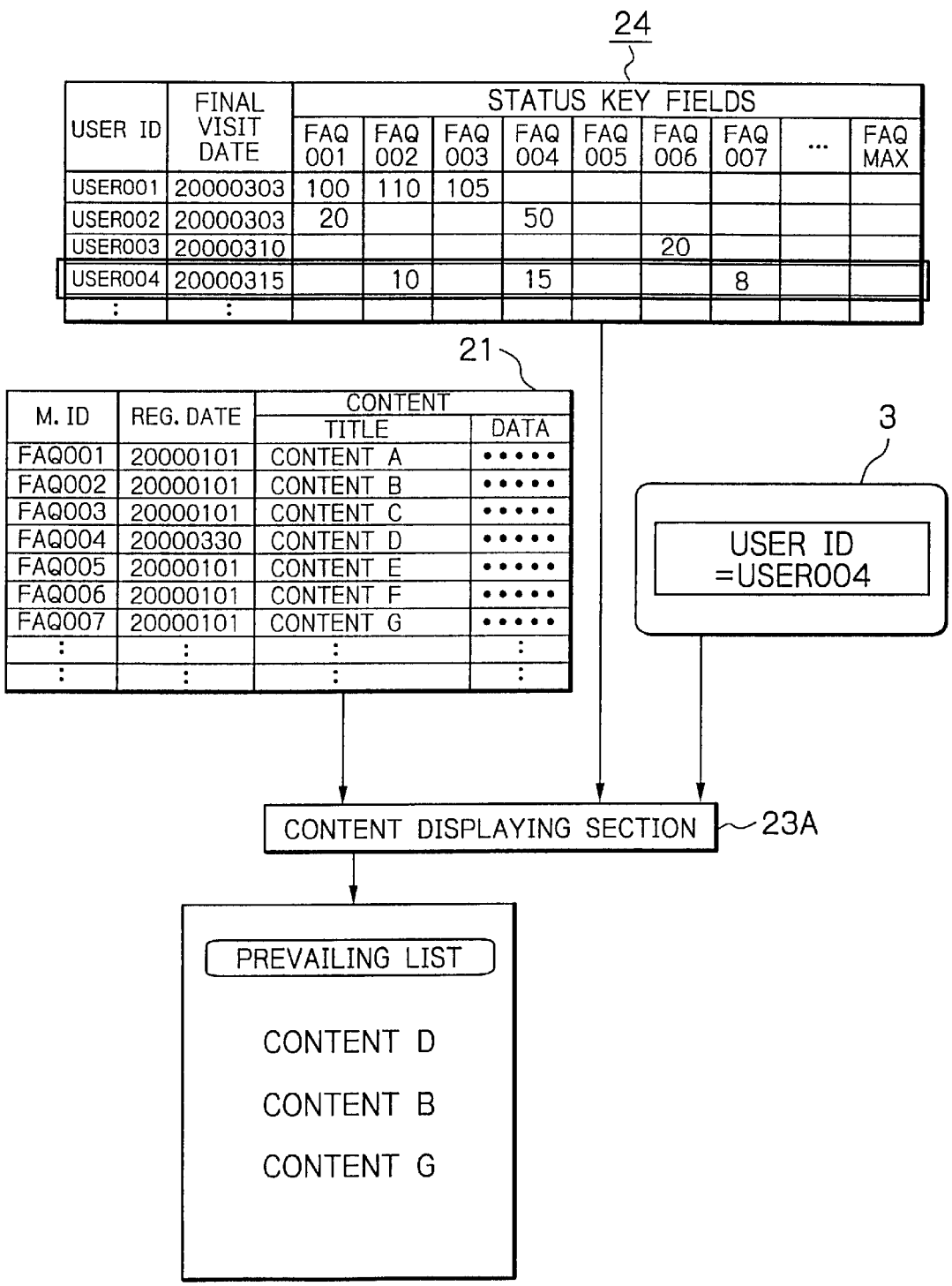

The operation of the user information managing section 25A at step 1606 of FIG. 16 is shown in the flowchart of FIG. 17 as well as FIG. 20 which is a partial diagram of the system of FIG. 14.

First, at step 1701, the user information managing section 25A allocates a user ID number such as USER004 for the user terminal 3.

Next, at step 1702, the user information managing section 25A adds a new record to the user information managing table 24A. In this case, the new record is formed by status key along with the visit date in correspondence with the user ID number. In the status key fields of the user ID number USER004 of FIG. 20, note that a status key "1" designates one-time of access state, while a status key "Δ(space)" designates a non-access state.

Next, at step 1703, the status key of an accessed content title is counted up by +1. For example, the status keys of the contents B, D and G are counted up, so that the values thereof are "1".

Next, at step 1704, the user information managing section 25A transmits the allocated user ID number to the user terminal 3.

Then, the control returns to step 1609 of FIG. 16.

Returning to FIG. 16, at step 1607, the content displaying section 23A displays the title list of the content managing table 21 by referring to the user information managing table 24A belonging to the user ID number such as USER004 on the display unit of the user terminal 3. In this case, the sequence of the displayed content titles depend on the number of accesses thereof. For example, as shown in FIG. 21, since the numbers of accesses to the content titles D, B and G and the other content titles are 15, 10 and 5, respectively, a list of the content D, B and G are displayed in this order on the display unit.

Next, at step 1608, the content display section 23A operates the user information managing section 25A.

Figure 18:
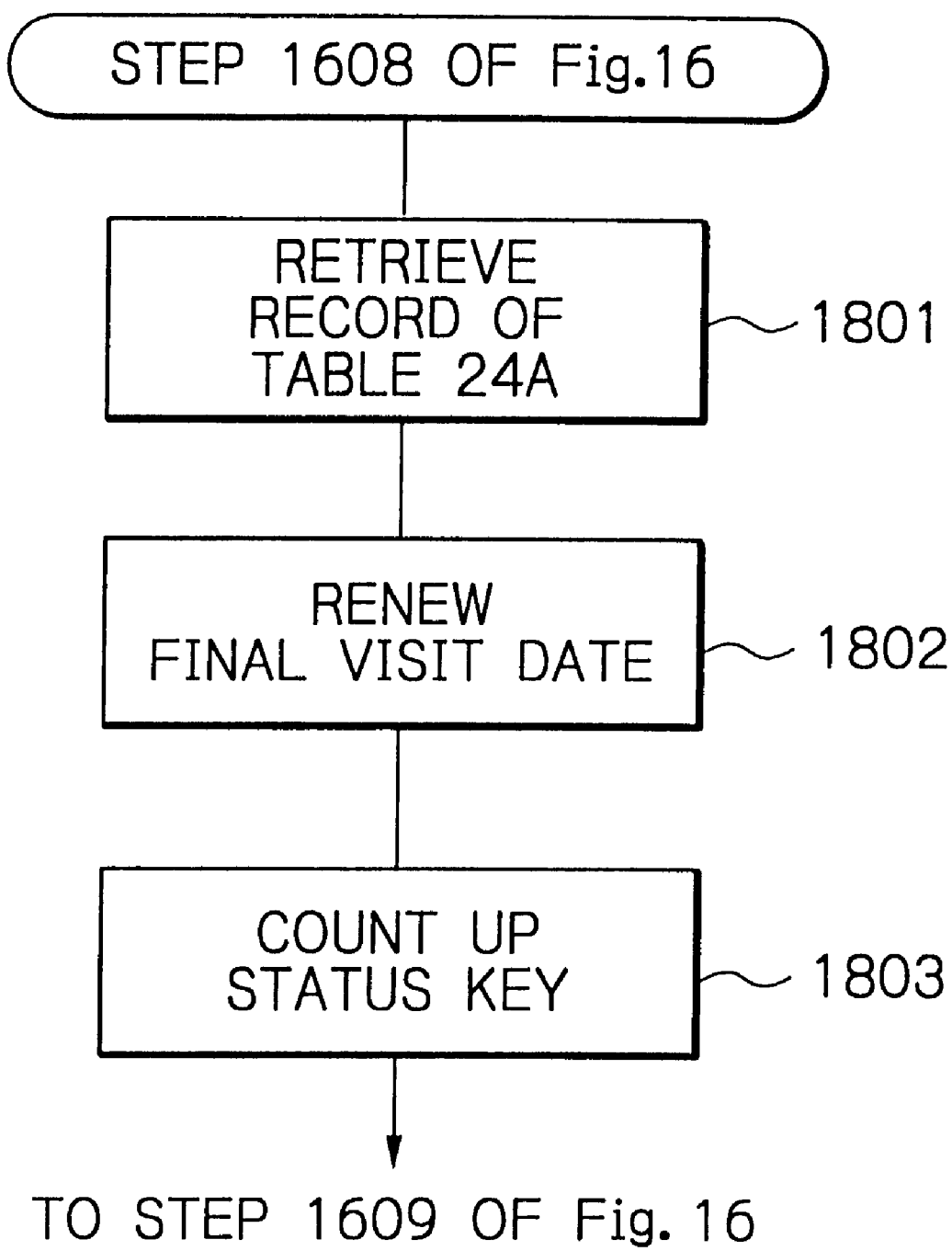
Figure 19:
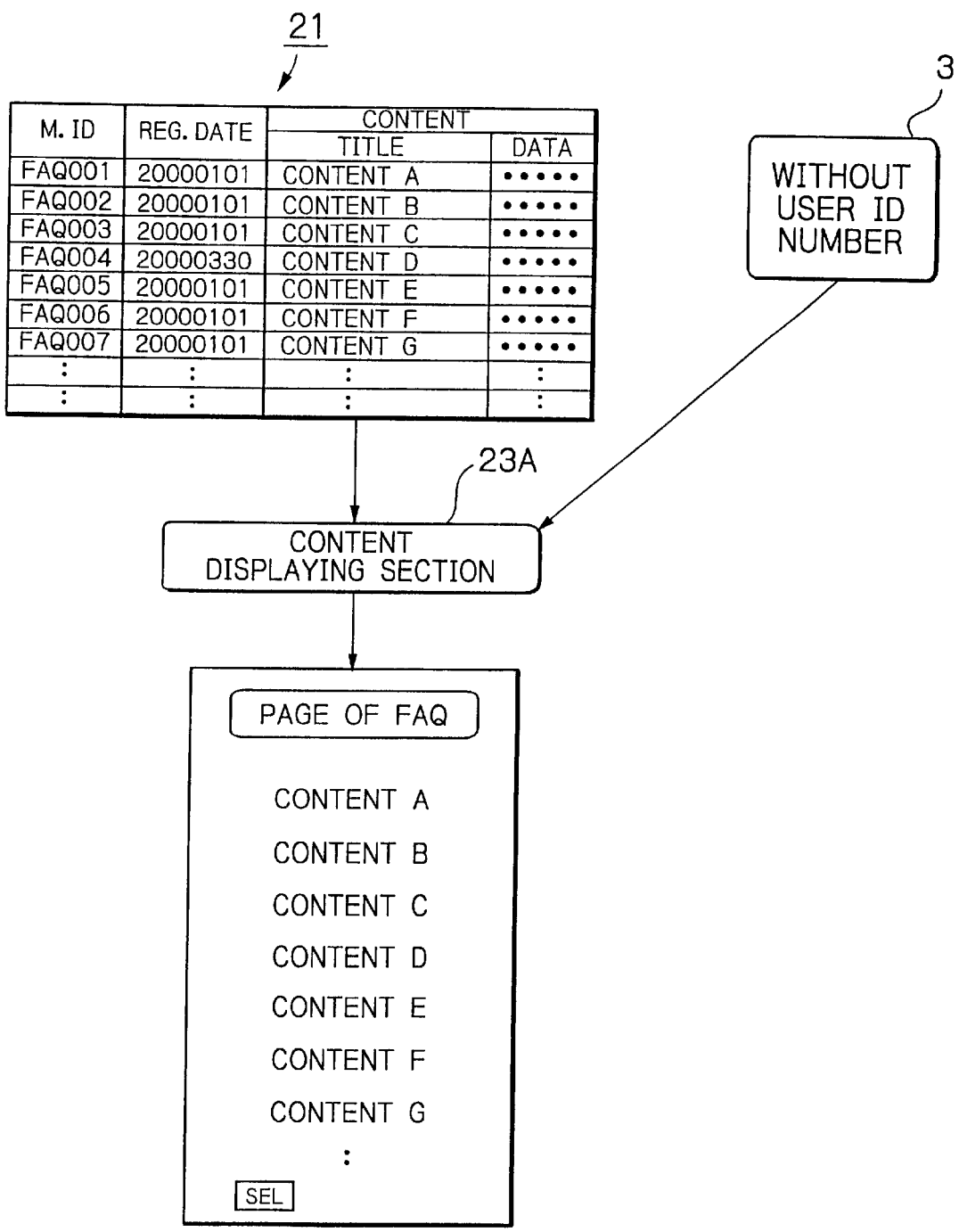
FIGS. 19, 20 and 21 are partial diagrams of the system of FIG. 14 for supplementing the flowchart of FIG. 16.

The operation of the user information managing section 25A at step 1608 of FIG. 16 is shown in the flowchart of FIG. 18.

First, at step 1801, the user information managing section 25A retrieves the record of the user information managing table 24A using the user ID number such as USER004 for the user terminal 3.

Next, at step 1803, the user information managing section 25A renews the final visit date and the status keys in correspondence with the user ID number such as USER004. For example, if the content B is accessed by the user terminal 3, the status key of the management ID number FAQ002 belonging to the user ID number USER004 is incremented by 1, so that this status key is changed from "10" to "11".

Next, at step 1803, the status key of an accessed content title is counted by +1.

Then, the control returns to step 1609 of FIG. 16.

Figure 22:
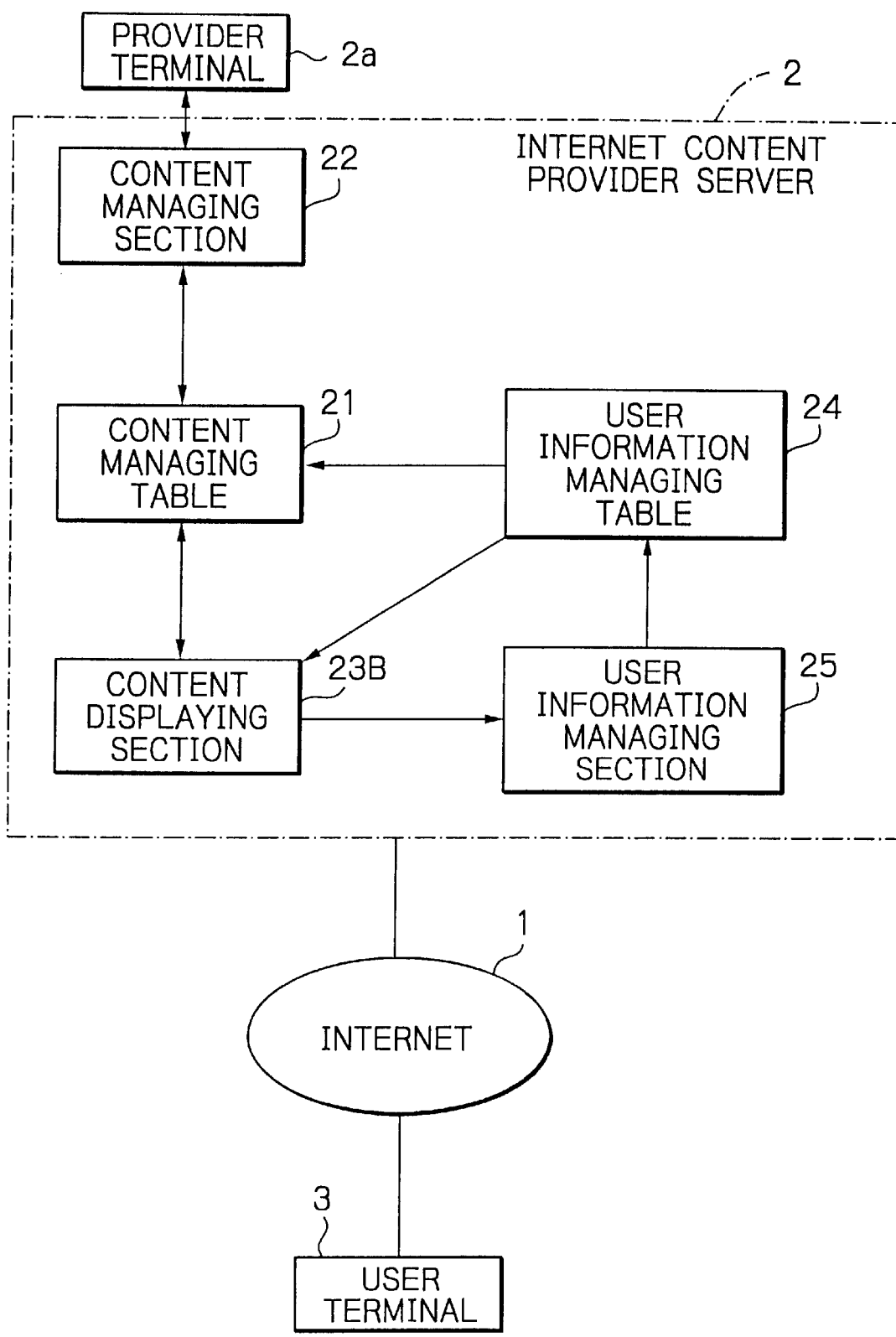
FIG. 22 is a block circuit diagram illustrating a third embodiment of the content providing system according to the present invention.

In FIG. 22, which illustrates a third embodiment of the content providing system according to the present invention, a content displaying section 23B is provided instead of the content displaying section 23 of FIG. 2, thus providing a renewed content title list, a new content title list and an all content title list in accordance with the final visit date and the status keys of the user information managing table 24 belonging to the user ID number.

Figure 23B:
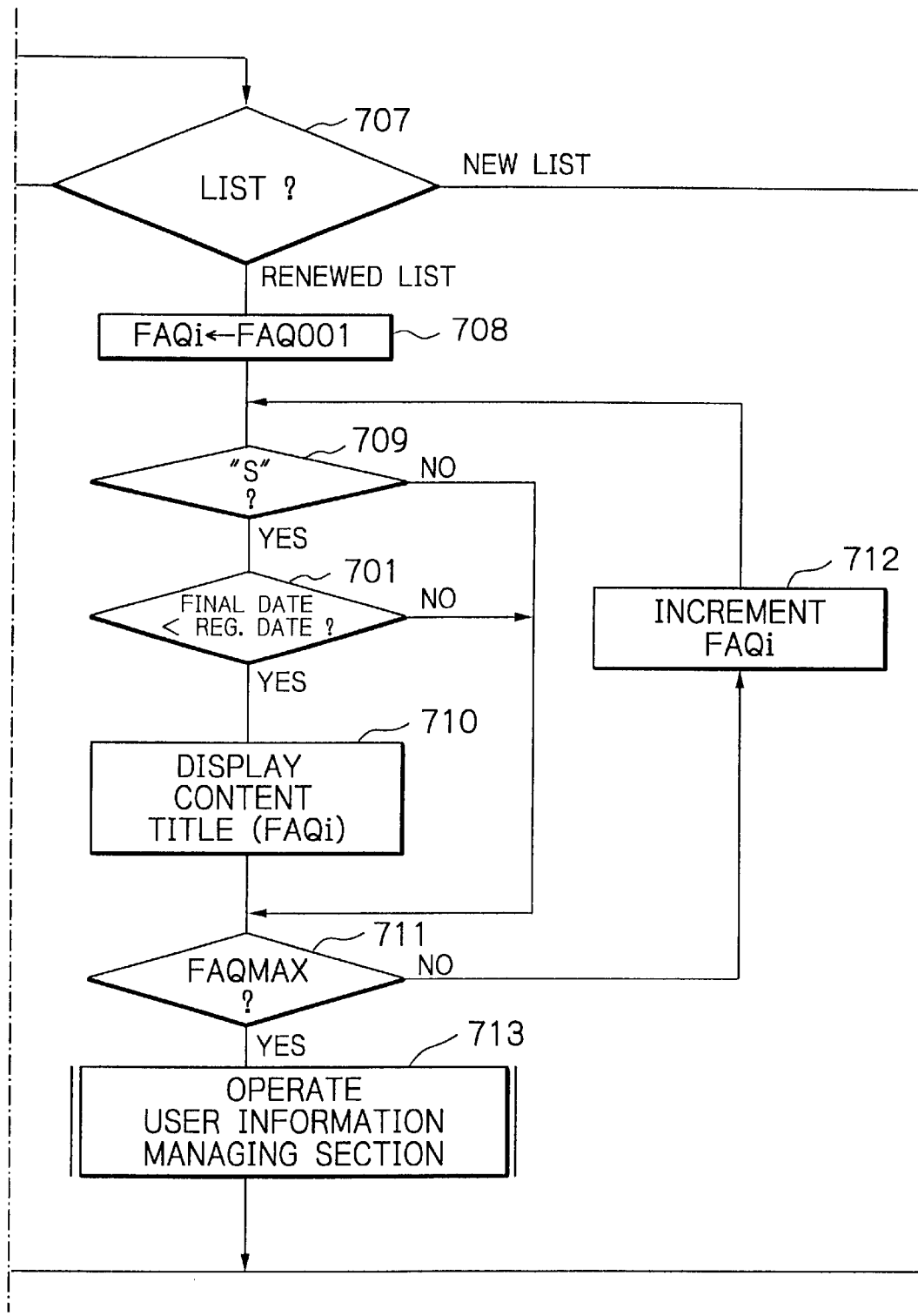
FIG. 23 is a flowchart showing the operation of the content managing section of FIG. 22.
Figure 23C:
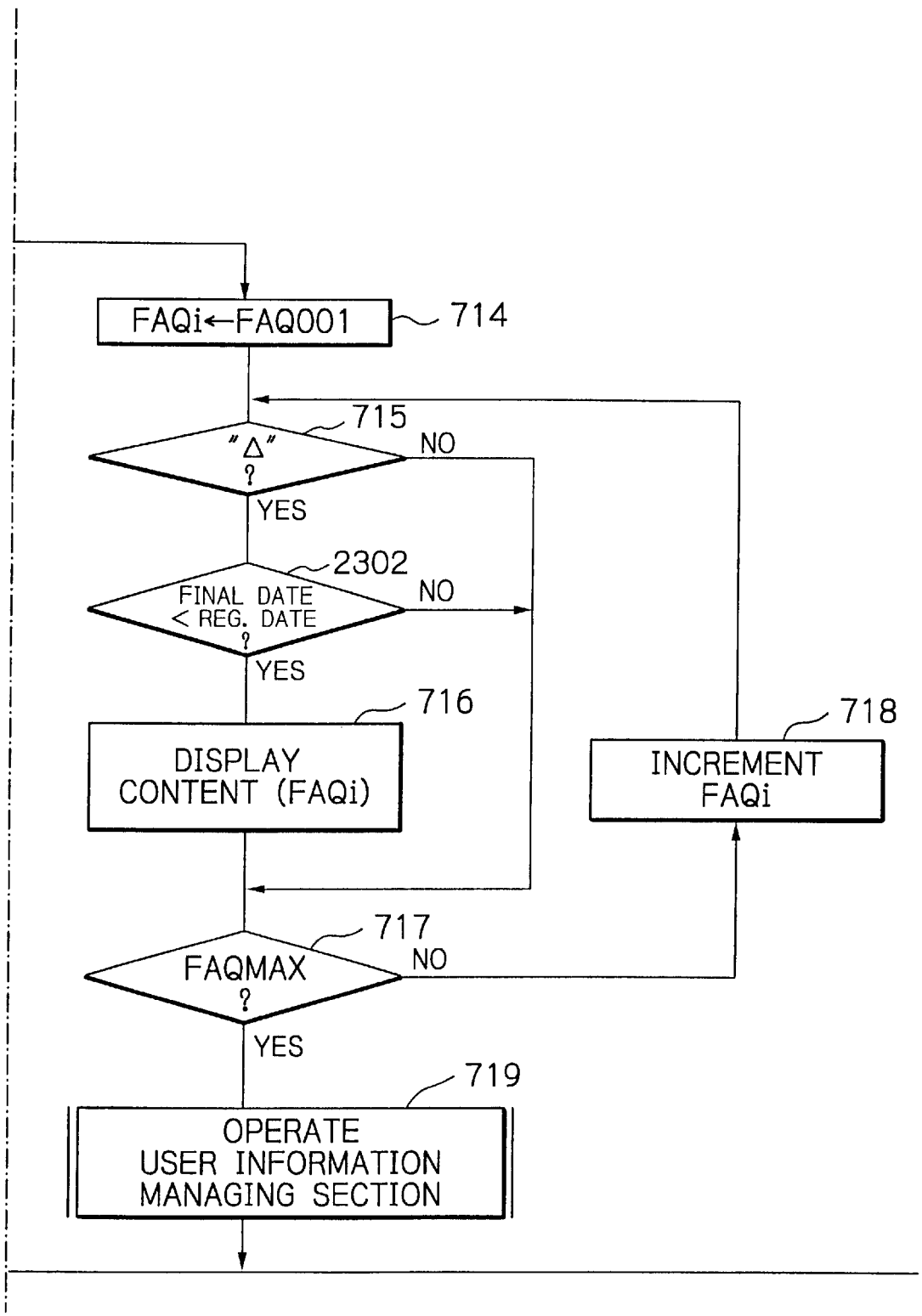
Figure 24:
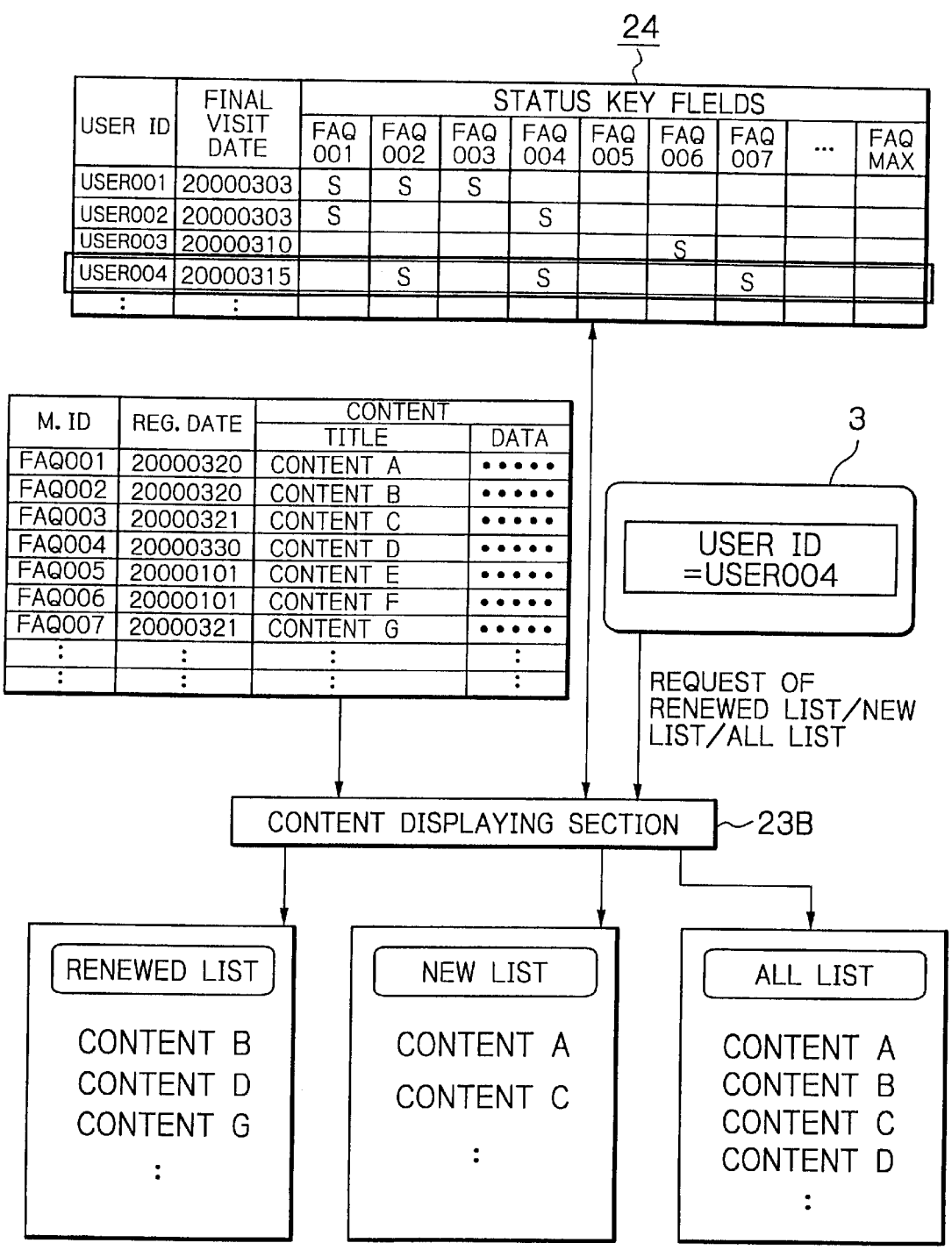
FIG. 24 is a partial diagram of the system of FIG. 22 for supplementing the flowchart of FIG. 23.

The operation of the content displaying section 23B of FIG. 23 is explained next with reference to the flowchart of FIG. 24.

The operation of the content displaying section 23B of FIG. 22 is explained next with reference to the flowcharts of FIGS. 23, 8, 9 and 10 as well as FIGS. 11, 12 and 24 which are partial diagrams of the system of FIG. 22.

In FIG. 23, steps 703, 707, 710 and 716 of FIG. 7 are modified into steps 703B, 707B, 710B and 716B, respectively, and steps 2301 and 2302 are added.

Steps 701 through 706 are carried out in the same way as in FIG. 7. In this case, steps 702 through 705 are explained with reference to FIG. 11, and step 706 is explained with reference to FIGS. 8 and 12. However, check boxes are unnecessary for the displayed content titles.

At step 707B, it is determined whether the user terminal 3 requests a renewed content title list which have been accessed by the user, a new content title list which have not been accessed yet by the user, or all content title list. If the user terminal 3 requests a renewed content title list, the control proceeds to steps 708 through 713. Also, if the user terminal 3 requests a new content title list, the control proceeds to steps 714 through 719. Further, if the user terminal 3 requests an all content title list, the control proceeds to steps 702 through 706.

Steps 708 through 713 are explained next by using FIG. 24.

At step 708, the initial number FAQ001 is set in a management ID number FAQi.

Next, at step 709, it is determined whether or not the status key of the management ID number FAQi belonging to the user ID number USER004 is "S". As a result, only when this status key is "S", does the control proceed to step 2301. Otherwise, the control proceeds directly to step 711.

At step 2301, it is determined whether or not the final visit date of the user is before the registered date (renewal date) of the content belonging to the management ID number FAQi. Only when the final visit date is before the registered date (renewal date), does the control proceed to step 710B. Otherwise, the control proceeds directly to step 711.

At step 710B, the content title without belonging to the management ID number FAQi is displayed on the display unit of the user terminal 3.

At step 711, it is determined whether or not FAQi is the maximum management ID number FAQMAX. Only when FAQi is FAQMAX, does the control proceeds to step 719. Otherwise, the control proceeds to step 712 which increments the management ID number FAQi, thus repeating the operation at steps 709, 7301, 710B and 711. For example, the content titles B, D and G are displayed by steps 709 to 712 on the display unit of the user terminal 3.

At step 713, the content display section 23B operates the user information managing section 25, so that the user information managing section 25 at step 713 of FIG. 23 operates as shown in the flowchart of FIG. 9.

Steps 714 through 719 are explained next by using FIG. 24.

At step 714, the initial number FAQ001 is set in a management ID number FAQi.

Next, at step 715, it is determined whether or not the status key of the management ID number FAQi belonging to the user ID number USER004 is "Δ(space)". As a result, only when this status key is "Δ(space)", does the control proceed to step 2302. Otherwise, the control proceeds directly to step 717.

At step 2302, it is determined whether or not the final visit date of the user is before the registered date (renewal date) of the content belonging to the management ID number FAQi. Only when the final visit date is before the registered date (renewal date), does the control proceed to step 716B. Otherwise, the control proceeds directly to step 717.

At step 716B, it is determined whether or not the the content title belonging to the management ID number FAQi is displayed on the display unit of the user terminal 3.

At step 717, it is determined whether or not FAQi is the maximum management ID number FAQMAX. Only when FAQi is FAQMAX, does the control proceeds to step 719. Otherwise, the control proceeds to step 718 which increments the management ID number FAQi, thus repeating the operation at steps 715, 2302, 716 and 717. For example, the content titles A, C, E and F are displayed by steps 714 to 718 on the display unit of the user terminal 3.

At step 719, the content display section 23B operates the user information managing section 25, so that the user information managing section 25 at step 719 of FIG. 23 operates as shown in the flowchart of FIG. 10.

In the above-described embodiments, whenever the user clicks a desired content title on the display unit, its corresponding content data is displayed on the content data window of the display unit.

As explained hereinabove, according to the present invention, since homepages customized for individual users are provided without feeding or scrolling pages, the burden on the users can be decreased.

I claim:

1. A content providing system comprising a content provider server connected between a network and a provider terminal, and user terminals connected to said network, wherein said content provider server comprises:
   a content managing table for storing contents along with content titles in correspondence with management identification numbers;
   a content managing section for managing said content managing table;
   a user information managing table for storing status keys showing access statuses of said content titles stored in said content managing table accessed by said user terminals in correspondence with user identification numbers thereof;
   a user information managing section for managing said user information managing table so as to set a respective one of said status keys when one of said user terminals accesses one said content titles stored in said content managing table; and
   a content displaying section for displaying a content title list on the display unit of said one of said user terminals in accordance with the status keys belonging to the user identification number of said one of said user terminals.

2. The system as set forth in claim 1, wherein said content managing section allocates a new management identification number to said content managing table so that a new content along with a content title is stored in said content managing table in correspondence with said new management identification number when said provider terminal transmits said new content to said content managing section,
   said content managing section retrieving a management identification number from said content managing table so that a renewed content is stored in said content managing table in correspondence with said retrieved management identification number when said provider terminal transmits said renewed content to said content managing section.

3. The system as set forth in claim 1, wherein, when one of said user terminals accesses said content provider server for the first time, said content displaying section displays a list of all of said content titles stored in said content managing table on the display unit of said one of said user terminals and operates said user information managing section to allocate a new user identification number to said one of said user terminals so that said user information managing table stores status keys of said content titles stored in said content managing table in correspondence with said new user identification number.

4. The system as set forth in claim 3, wherein said user information management section transmits said allocated user identification number to said one of said user terminals.

5. The system as set forth in claim 4, wherein, when one of said user terminals along with its user identification number accesses said content provider server, said content displaying section retrieves the user identification number of said one of said user terminals from said user information managing table to display a prevailing list of content titles having set status keys in correspondence with said retrieved user identification number.

6. The system as set forth in claim 4, wherein, when one of said user terminals along with its user identification number accesses said content provider server, said content displaying section retrieves the user identification number of said one of said user terminals from said user information managing table to display a non-prevailing list of content titles having unset status keys in correspondence with said retrieved user identification number.

7. A content providing system comprising a content provider server connected between a network and a provider terminal, and user terminals connected to said network, wherein said content provider server comprises:
   a content managing table for storing contents along with content titles in correspondence with management identification numbers;
   a content managing section for managing said content managing table;
   a user information managing table for storing access numbers of said content titles stored in said content managing table accessed by said user terminals in correspondence with user identification numbers thereof;
   a user information managing section for managing said user information managing table so as to increment a respective one of said access numbers when one of said user terminals accesses one of said content titles stored in said content managing table; and a content displaying section for displaying a content title list on the display unit of said one of said user terminals in accordance with the access numbers belonging to the user identification number of said one of said user terminals.

8. The system as set forth in claim 7, wherein said content managing section allocates a new management identification number to said content managing table so that a new content along with a content title is stored in said content managing table in correspondence with said new management identification number when said provider terminal transmits said new content to said content managing section, said content managing section retrieving a management identification number from said content managing table so that a renewed content is stored in said content managing table in correspondence with said retrieved management identification number when said provider terminal transmits said renewed content to said content managing section.

9. The system as set forth in claim 7, wherein, when one of said user terminals accesses said content provider server for the first time, said content displaying section displays a list of all of said content titles stored in said content managing table on the display unit of said one of said user terminals and operates said user information managing section to allocate a new user identification number to said one of said user terminals so that said user information managing table stores status keys of said content titles stored in said content managing table in correspondence with said new user identification number.

10. The system as set forth in claim 9, wherein said user information management section transmits said allocated user identification number to said one of said user terminals.

11. The system as set forth in claim 10, wherein, when one of said user terminals along with its user identification number accesses said content provider server, said content displaying section retrieves the user identification number of said one of said user terminals from said user information managing table to display a prevailing list of content titles having a sequence depending the access numbers in correspondence with said retrieved user identification number.

12. A content providing system comprising a content provider server connected between a network and a provider terminal, and user terminals connected to said network, wherein said content provider server comprises:

a content managing table for storing contents along content titles and registered dates in correspondence with management identification numbers;

a content managing section for managing said content managing table;

a user information managing table for storing status keys showing access statuses of said content titles stored in said content managing table along with final visit dates accessed by said user terminals in correspondence with user identification numbers thereof;

a user information managing section for managing said user information managing table so as to set a respective one of said status keys and renew a respective one of said final visit dates when one of said user terminals accesses of one of said content titles stored in said content managing table; and a content displaying section for displaying a content title list on the display unit of said one of said user terminals in accordance with the status keys and the final visit date belonging to the user identification number of said one of said user terminals and the registered dates of said content titles stored in said content managing table.

13. The system as set forth in claim 12, wherein said content managing section allocates a new management identification number to said content managing table so that a new content along with its registered date is stored in said content managing table in correspondence with said new management identification number when said provider terminal transmits said new content to said content managing section, said content managing section retrieving a management identification number from said content managing table so that a renewed content along with a renewed registered date is stored in said content managing table in correspondence with said retrieved management identification number when said provider terminal transmits said renewed content to said content managing section.

14. The system as set forth in claim 12, wherein, when one of said user terminals accesses said content provider server for the first time, said content displaying section displays a list of all of said content titles stored in said content managing table on the display unit of said one of said user terminals and operates said user information managing section to allocate a new user identification number to said one of said user terminals so that said user information managing table stores status keys of said content titles stored in said content managing table along with a final visit date in correspondence with said new user identification number.

15. The system as set forth in claim 14, wherein said user information management section transmits said allocated user identification number to said one of said user terminals.

16. The system as set forth in claim 15, wherein, when one of said user terminals along with its user identification number accesses said content provider server, said content displaying section retrieves the user identification number of said one of said user terminals from said user information managing table to display a renewed list of content titles having set status keys in correspondence with said retrieved user identification number and having registered dates after the final visit date belonging to said retrieved user identification number.

17. The system as set forth in claim 15, wherein, when one of said user terminals along with its user identification number accesses said content provider server, said content displaying section retrieves the user identification number of said one of said user terminals from said user information managing table to display a new list of content titles having unset status keys in correspondence with said retrieved user identification number and having registered dates after the final visit date belonging to said retrieved user identification number.

18. A content providing method for a content providing system comprising a content provider server connected between a network and a provider terminal, and user terminals connected to said network, said content providing method comprising the steps of:

storing contents along with content titles in said content provider server in correspondence with management identification numbers;

storing status keys showing access statuses of said content titles stored in said content provider server accessed by said user terminals in correspondence with user identification numbers thereof;

managing said stored content titles so as to set a respective one of said status keys when one of said user terminals accesses of one of said stored content titles; and displaying a content title list on the display unit of said one of said user terminals in accordance with the status keys belonging to the user identification number of said one of said user terminals.

19. The method as set forth in claim 18, further comprising the steps of:

allocating a new management identification number to said content provider server so that a new content along with a content title is stored in said content provider server in correspondence with said new management identification number when said provider terminal transmits said new content to said content provider server, and retrieving a management identification number so that a renewed content is stored in said content provider server in correspondence with said retrieved management identification number when said provider terminal transmits said renewed content to said content provider server.

20. The method as set forth in claim 19, further comprising a step of, when one of said user terminals accesses said content provider server for the first time, displaying a list of all of said content titles stored in said content provider server on the display unit of said one of said user terminals and allocating a new user identification number to said one of said user terminals so that status keys of said content titles are stored in said content provider server in correspondence with said new user identification number.

21. The method as set forth in claim 20, further comprising a step of transmitting said allocated user identification number to said one of said user terminals.

22. The method as set forth in claim 21, further comprising a step of, when one of said user terminals along with its user identification number accesses said content provider server, retrieving the user identification number of said one of said user terminals to display a prevailing list of content titles having set status keys in correspondence with said retrieved user identification number.

23. The method as set forth in claim 21, further comprising a step of, when one of said user terminals along with its user identification number accesses said content provider server, retrieving the user identification number of said one of said user terminals to display a non-prevailing list of content titles having unset status keys in correspondence with said retrieved user identification number.

24. A content providing method for a content providing system comprising a content provider server connected between a network and a provider terminal, and user terminals connected to said network, said content providing method comprising the steps of:

storing contents along with content titles in said content provider server in correspondence with management identification numbers;

storing access numbers of said content titles stored in said content provider server accessed by said user terminals in correspondence with user identification numbers thereof;

managing said stored content titles so as to increment a respective one of said access numbers when one of said user terminals accesses one of said stored content titles; and displaying a content title list on the display unit of said one of said user terminals in accordance with the access numbers belonging to the user identification number of said one of said user terminals.

25. The method as set forth in claim 24, further comprising the steps of:

allocating a new management identification number to said content provider server so that a new content along with a content title is stored in said content provider server in correspondence with said new management identification number when said provider terminal transmits said new content to said content provider server; and retrieving a management identification number said so that a renewed content is stored in said content provider server in correspondence with said retrieved management identification number when said provider terminal transmits said renewed content to said content provider server.

26. The method as set forth in claim 24, further comprising a step of, when one of said user terminals accesses said content provider server for the first time, displaying a list of all of said content titles stored in said content provider server on the display unit of said one of said user terminals and to allocating a new user identification number to said one of said user terminals so that status keys of said content titles are stored in said content provider server in correspondence with said new user identification number.

27. The method as set forth in claim 26, further comprising a step of transmitting said allocated user identification number to said one of said user terminals.

28. The method as set forth in claim 27, further comprising a step of, when one of said user terminals along with its user identification number accesses said content provider server, retrieving the user identification number of said one of said user terminals to display a prevailing list of content titles having a sequence depending on the access numbers in correspondence with said retrieved user identification number.

29. A content providing method for a content providing system comprising a content provider server connected between a network and a provider terminal, and user terminals connected to said network, said content providing method comprising the steps of:

storing contents along with content titles and registered dates in said content provider server in correspondence with management identification numbers;

storing status keys showing access statuses of said content titles stored in said content provider server along with registered dates accessed by said user terminals in correspondence with user identification numbers thereof;

managing said stored content so as to set a respective one of said status keys and renew a respective one of said final visit dates when one of said user terminals accesses of one of said stored content titles; and displaying a content title list on the display unit of said one of said user terminals in accordance with the status keys and the final visit date belonging to the user identification number of said one of said user terminals and the registered dates of said content titles stored in said content provider server.

30. The method as set forth in claim 29, further comprising the steps of:

allocating a new management identification number to said content provider server so that a new content along with its registered date is stored in said content provider server in correspondence with said new management identification number when said provider terminal transmits said new content to said content provider server; and retrieving a management identification number so that a renewed content along with its registered date is stored in said content provider server in correspondence with said retrieved management identification number when said provider terminal transmits said renewed content to said content provider server.

31. The method as set forth in claim 29, further comprising a step of, when one of said user terminals accesses said content provider server for the first time, displaying a list of all of said content title stored in said content provider server on the display unit of said one of said user terminals and allocating a new user identification number to said one of said user terminals so that status keys of said content titles along with a final visit date are stored in said content provider server in correspondence with said new user identification number.

32. The method as set forth in claim 31, further comprising a step of transmitting said allocated user identification number to said one of said user terminals.

33. The method as set forth in claim 32, further comprising a step of, when one of said user terminals along with its user identification number accesses said content provider server, retrieving the user identification number of said one of said user terminals to display a renewed list of content titles having set status keys in correspondence with said retrieved user identification number and having registered dates after the final visit date belonging to said retrieved user identification number.

34. The method as set forth in claim 32, further comprising a step of, when one of said user terminals along with its user identification number accesses said content provider server, retrieving the user identification number of said one of said user terminals to display a new list of content, titles having unset status keys in correspondence with said retrieved user identification number and having registered dates after the final visit date belonging to said retrieved user identification number.

* * * * *